United States Patent
Abdo et al.

(10) Patent No.: US 7,408,882 B2
(45) Date of Patent: Aug. 5, 2008

(54) AUTOMATIC DISCOVERY OF NETWORK NODE ADDRESSES

(75) Inventors: Miguel Abdo, Gulfport, FL (US); Greg Munroe, Largo, FL (US); William H. Venz, Seminole, FL (US)

(73) Assignee: Paradyne Corporation, Largo, FL (US)

( * ) Notice: Subject to any disclaimer, the term of this patent is extended or adjusted under 35 U.S.C. 154(b) by 959 days.

(21) Appl. No.: 10/602,940

(22) Filed: Jun. 24, 2003

(65) Prior Publication Data

US 2004/0264389 A1 Dec. 30, 2004

Related U.S. Application Data

(60) Provisional application No. 60/391,098, filed on Jun. 24, 2002, provisional application No. 60/391,121, filed on Jun. 24, 2002, provisional application No. 60/391,053, filed on Jun. 24, 2002.

(51) Int. Cl.
*G01R 31/08* (2006.01)
(52) U.S. Cl. .................. 370/249; 370/252; 370/392; 370/401
(58) Field of Classification Search ............... None
See application file for complete search history.

(56) References Cited

U.S. PATENT DOCUMENTS

| | | | |
|---|---|---|---|
| 6,711,171 B1 * | 3/2004 | Dobbins et al. | 370/400 |
| 6,795,403 B1 * | 9/2004 | Gundavelli | 370/256 |
| 7,020,138 B2 * | 3/2006 | Huang | 370/392 |
| 7,187,658 B2 * | 3/2007 | Koyanagi et al. | 370/254 |
| 2002/0177910 A1 * | 11/2002 | Quarterman et al. | 700/28 |
| 2004/0052257 A1 | 3/2004 | Abdo et al. | |

OTHER PUBLICATIONS

RFC 1256, "ICMP Router Discovery Message", 1991, pp. cover.*
RFC 1812, "Requirement for IP Versioin 4 Routers", 1995, pp. cover, 58-59.*
Co-pending application entitled "Determination of Network Performance Characteristics", having U.S. Appl. No. 10/515,222, filed Nov. 19, 2004.
J. Postel, "Internet Control Message Protocol," IETF RFC 792, Sep. 1981, www.ietf.org/rfc0792txt.

(Continued)

*Primary Examiner*—Edan Orgad
*Assistant Examiner*—Jung Park
(74) *Attorney, Agent, or Firm*—Thomas, Kayden, Horstemeyer & Risley LLP

(57) ABSTRACT

The present invention provides a system and method for automatic discovery of network addresses. Briefly described, in architecture, one embodiment of the apparatus, among others, comprises: an announcer logic; a listener logic; and a forwarder logic. The announcer logic is configured to transmit a node address and a forward counter associated with each known node in a list, if the forward counter is greater than zero, to all nodes in the list having a static type. The listener logic is configured to receive an announcement packet and to add to the list of known nodes at least one new node. The node address and the forward counter of the new node correspond to the announcement packet, and the new node has a discovered type. The forwarder logic is configured to transmit the node address and the forward counter associated with the new node, if the forward counter is greater than zero, to all known nodes in the list.

33 Claims, 18 Drawing Sheets

OTHER PUBLICATIONS

G. Malkin, "RIP Version 2," IETF RFC 2453, Nov. 1998, www.ietf.org/rfc/rfc2453.txt.

J. Moy, "OSPF Version 2," IETF RFC 2328, Apr. 1998, www.ietf.org/rfc/rfc2398.txt.

J. Hodges, "Lightweight Directory Access Protocol (v3): Technical Specification," IETF RFC 3377, Sep. 2002, www.ietf.org/rfc/rfc3377.txt.

P. Mockapetris, "Domain Names—Implementation and Specification," IETF RFC 1035, Nov. 1987, www.ietf.org/rfc/rfc1035.txt.

RFC 3531: A Flexible Method for Managing the Assignment of Bits of an IPv6 Address Block (Available at ftp://ftp.isi.edu/in-notes/rfc3531.txt); Marc Blanchett; Apr. 2003; pp. 1-7.

RFC 1332: The PPP Internet Protocol Control Protocol (IPCP) (Available at ftp://ftp.isi.edu/in-notes/rfc1332.txt); Glenn McGregor; May 1992; pp. 1-12.

RFC 1333: PPP Link Quality Monitoring (Available at ftp://ftp.isi.edu/in-notes/rfc1333.txt); William Allen Simpson; May 1992; pp. 1-15.

RFC 1764: The PPP XNS IDP Control Protocol (XNSCP) (Available at ftp://ftp.isi.edu/in-notes/rfc1764.txt); Steven J. Senum; Mar. 1995; pp. 1-5.

RFC 1788: ICMP Domain Name Messages (Available at ftp://ftp.isi.edu/in-notes/rfc1788.txt); William Allen Simpson; Apr. 1995; pp. 1-7.

RFC 1944: Benchmarking Methodology for Network Interconnect Devices (Available at ftp://ftp.isi.edu/in-notes/rfc1944.txt); Scott Bradner and Jim McQuaid, Editors; May 1996; pp. 1-30.

RFC 1963: PPP Serial Data Transport Protocol (SDTP) (Available at ftp://ftp.isi.edu/in-notes/rfc1963.txt); Kevin Schneider and Stuart Venters; Aug. 1996; pp. 1-20.

RFC 2467: Transmission of IPv6 Packets over FDDI Networks (Available at ftp://ftp.isi.edu/in-notes/rfc2467.txt); Matt Crawford; Dec. 1998; pp. 1-9.

RFC 2470: Transmission of IPv6 Packets over Token Ring Networks (Available at ftp://ftp.isi.edu/in-notes/rfc2470.txt); Matt Crawford, Thomas Narten, and Stephen Thomas; Dec. 1998; pp. 1-11.

RFC 2979: Behavior of and Requirements for Internet Firewalls (Available at ftp://ftp.isi.edu/in-notes/rfc2979.txt); Ned Freed; Oct. 2000: pp. 1-7.

RFC 2993: Architectural Implications of NAT (Available at ftp://ftp.isi.edu/in-notes/rfc2993.txt); Tony Hain; Nov. 2000; pp. 1-29.

RFC 3133: Terminology for Frame Relay Benchmarking (Available at ftp://ftp.isi.edu/in-notes/rfc3133.txt); Jeffrey Dunn and Cynthia Martin; Jun. 2001; pp. 1-24.

RFC 3134: Terminology for ATM ABR Benchmarking (Available at ftp://ftp.isi.edu/in-notes/rfc3134.txt); Jeffrey Dunn and Cynthia Martin; Jun. 2001; pp. 1-16.

RFC 2471: IPv6 Testing Address Allocation (Available at ftp://ftp.isi.edu/in-notes/rfc2471.txt); Robert M. Hinden, Robert Fink, and Jon Postel; Dec. 1998; pp. 1-5.

RFC 2472: IP Version 6 over PPP (Available at ftp://ftp.isi.edu/in-notes/rfc2472.txt); Dimitry Haskin and Ed Allen; Dec. 1998; pp. 1-14.

RFC 2473: Generic Packet Tunneling in IPv6 Specification (Available at ftp://ftp.isi.edu/in-notes/rfc2473.txt); Alex Conta and Stephen Deering; Dec. 1998; pp. 1-36.

RFC 2492: IPv6 over ATM Networks (Available at ftp://ftp.isi.edu/in-notes/rfc2492.txt); Grenville Armitage and Peter Schulter; Jan. 1999; pp. 1-12.

RFC 2497: Transmision of IPv6 Packets over ARCnet Networks (Available at ftp://ftp.isi.edu/in-notes/rfc2497.txt); Ignatios Souvatzis; Jan. 1999; pp. 1-6.

RFC 2507: IP Header Compression (Available at ftp://ftp.isi.edu/in-notes/rfc2507.txt); Mikael Degermark, Bjorn Nordgren, and Stephen Pink; Feb. 1999; pp. 1-47.

RFC 2509: IP Header Compression over PPP (Available at ftp://ftp.isi.edu/in-notes/rfc2509.txt); Mathias Engan, Stephen L. Casner, and Carsten Bormann; Feb. 1999; pp. 1-10.

RFC 2516: A Method for Transmitting PPP Over Ethernet (PPPoE) (Available at ftp://ftp.isi.edu/in-notes/rfc2516.txt); Louis Mamakos, Kurt Lidl, Jeff Evarts, David Carrel, Dan Simone, and Ross Wheeler; Feb. 1999; pp. 1-17.

RFC 2521: ICMP Security Failures Messages (Available at ftp://ftp.isi.edu/in-notes/rfc2521.txt); Phil Karn and William Allen Simpson; Mar. 1999; pp. 1-7.

RFC 2526: Reserved IPv6 Subnet Anycast Addresses (Available at ftp://ftp.isi.edu/in-notes/rfc2526.txt); David B. Johnson and Stephen E. Deering; Mar. 1999; pp. 1-7.

RFC 2816: A Framework for Integrated Services Over Shared and Switched IEEE 802 LAN Technologies (Available at ftp://ftp.isi.edu/in-notes/rfc2816.txt); Anoop Ghanwani, Wayne Pace, Vijay Srinivasan, Andrew Smith, and Mick Seaman; May 2000; pp. 1-47.

RFC 2823: PPP over Simple Data Link (SDL) using SONET/SDH with ATM-like framing (Available at ftp://ftp.isi.edu/in-notes/rfc2823.txt); James Carlson, Paul Langner, Enrique J. Hernandez-Valencia, and James Manchester; May 2000; pp. 1-28.

RFC 2878: PPP Bridging Control Protocol (BCP) (Available at ftp://ftp.isi.edu/in-notes/rfc2878.txt); Mitsuru Higashiyama and Fred Baker; Jul. 2000; pp. 1-38.

RFC 2889: Benchmarking Methodology for LAN Switching Devices (Available at ftp://ftp.isi.edu/in-notes/rfc2889.txt); Robert Mandeville and Jerry Perser; Aug. 2000; pp. 1-35.

RFC 2893: Transition Mechanisms for IPv6 Hosts and Routers (Available at ftp://ftp.isi.edu/in-notes/rfc2893.txt); Robert E. Gilligan and Erik Nordmark; Aug. 2000; pp. 1-29.

RFC 2917: A Core MPLS IP VPN Architecture (Available at ftp://ftp.isi.edu/in-notes/rfc2917.txt); Karthik Muthukrishnan and Andrew Malis; Sep. 2000; pp. 1-16.

RFC 2960: Stream Control Transmission Protocol (Available at ftp://ftp.isi.edu/in-notes/rfc2960.txt); Randall R. Stewart, Qiaobing Xie, Ken Morneault, Chip Sharp, Hanns Juergen Schwarzbauer, Tom Taylor, Ian Rytina, Malleswar Kalla, Lixia Zhang, and Vern Paxson; Oct. 2000; pp. 1-134.

RFC 2962: An SNMP Application Level Gateway for Payload Address Translation (Available at ftp://ftp.isi.edu/in-notes/rfc2962.txt); Danny Raz, Juergen Schoenwaelder, and Binay Sugla; Oct. 2000; pp. 1-20.

RFC 3022: Traditional IP Network Address Translator (Traditional NAT) (Available at ftp://ftp.isi.edu/in-notes/rfc3022.txt); Pyda Srisuresh and Kjeld Borch Egevang; Jan. 2001; pp. 1-16.

RFC 3027: Protocol Complications with the IP Network Address Translator (Available at ftp://ftp.isi.edu/in-notes/rfc3027.txt); Matt Holdrege and Pyda Srisuresh; Jan. 2001; pp. 1-20.

RFC 3031: Multiprotocol Label Switching Architecture (Available at ftp://ftp.isi.edu/in-notes/rfc3031.txt); Eric C. Rosen, Arun Viswanathan, and Ross Callon; Jan. 2001; pp. 1-61.

RFC 3032: MPLS Label Stack Encoding (Available at ftp://ftp.isi.edu/in-notes/rfc3032.txt); Eric C. Rosen, Dan Tappan, Yakov Rekhter, Guy Fedorkow, Dino Farinacci, Tony Li, and Alex Conta; Jan. 2001; pp. 1-23.

RFC 3034: Use of Label Switching on Frame Relay Networks Specification (Available at ftp://ftp.isi.edu/in-notes/rfc3034.txt); Alex Conta, Paul Doolan, and Andrew G. Malis; Jan. 2001; pp. 1-24.

RFC 3035: MPLS using LDP and ATM VC Switching (Available at ftp://ftp.isi.edu/in-notes/rfc3035.txt); Bruce Davie, Paul Doolan, Jeremy Lawrence, Keith McCloghrie, Yakov Rekhter, Eric Rosen, and George Swallow; Jan. 2001; pp. 1-20.

RFC 3053: IPv6 Tunnel Broker (Available at ftp://ftp.isi.edu/in-notes/rfc3053.txt); Alain Durand, Paolo Fasano, Ivano Guardini, and Domenico Lento; Jan. 2001; pp. 1-13.

RFC 3056: Connection of IPv6 Domains via IPv4 Clouds (Available at ftp://ftp.isi.edu/in-notes/rfc3056.txt); Brian E. Carpenter and Keith Moore; Feb. 2001; pp. 1-23.

RFC 3057: ISDN Q.921-User Adaptation Layer (Available at ftp://ftp.isi.edu/in-notes/rfc3057.txt); Ken Morneault, Malleswar Kalla, Selvarn Rengasami, and Greg Sidebottom; Feb. 2001; pp. 1-66.

RFC 3070: Layer Two Tunneling Protocol (L2TP) over Frame Relay (Available at ftp://ftp.isi.edu/in-notes/rfc3070.txt); Vipin Rawat, Rene Tio, Rohit Verma, and Suhail Nanji; Feb. 2001; pp. 1-7.

RFC 3077: A Link-Layer Tunneling Mechanism for Unidirectional Links (Available at ftp://ftp.isi.edu/in-notes/rfc3077.txt); Emmanuel Duros, Walid Dabbous, Hidetaka Izumiyama, Noboru Fujii, and Yongguang Zhang; Mar. 2001; pp. 1-25.

RFC 3089: A Socks-based IPv6/IPv4 Gateway Mechanism (Available at ftp://ftp.isi.edu/in-notes/rfc3089.txt); Hiroshi Kitamura; Apr. 2001; pp. 1-12.

RFC 3102: Realm Specific IP: Framework (Available at ftp://ftp.isi.edu/in-notes/rfc3102.txt); Michael Borella, Jeffrey Lo, David Grabelsky, and Gabriel E. Montenegro; Oct. 2001; pp. 1-30.

RFC 3103: Realm Specific IP: Protocol Specification (Available at ftp://ftp.isi.edu/in-notes/rfc3103.txt); Michael Borella, David Grabelsky, Jeffrey Lo, and Kunihiro Taniguchi; Oct. 2001; pp. 1-54.

RFC 3104: RSIP Support for End-to-end IPsec (Available at ftp://ftp.isi.edu/in-notes/rfc3104.txt); Gabriel E. Montenegro and Michael Borella; Oct. 2001; pp. 1-19.

RFC 3105: Finding an RSIP Server with SLP (Available at ftp://ftp.isi.edu/in-notes/rfc3105.txt); James Kempf and Gabriel E. Montenegro; Oct. 2001; pp. 1-11.

RFC 3116: Methodology for ATM Benchmarking (Available at ftp://ftp.isi.edu/in-notes/rfc3116.txt); Jeffrey Dunn and Cynthia Martin; Jun. 2001; pp. 1-127.

RFC 3122: Extensions to IPv6 Neighbor Discovery for Inverse Discovery Specification (Available at ftp://ftp.isi.edu/in-notes/rfc3122.txt); Alex Conta; Jun. 2001; pp. 1-20.

RFC 1090: SMTP on X.25 (Available at ftp://ftp.isi.edu/in-notes/rfc1090.txt); Robert Ullmann; Feb. 1989; pp. 1-4.

RFC 1103: A Proposed Standard for the Transmission of IP Datagrams over FDDI Networks (Available at ftp://ftp.isi.edu/in-notes/rfc1103.txt); Dave Katz; Jun. 1989; pp. 1-9.

RFC 1663: PPP Reliable Transmission (Available at ftp://ftp.isi.edu/in-notes/rfc1663.txt); Dave Rand; Jul. 1994; pp. 1-8.

RFC 1700: Assigned Numbers (Available at ftp://ftp.isi.edu/in-notes/rfc1700.txt); Joyce K. Reynolds and Jon Postel; Oct. 1994; pp. 1-230.

RFC 2285: Benchmarking Terminology for LAN Switching Devices (Available at ftp://ftp.isi.edu/in-notes/rfc2285.txt); Robert Mandeville; Feb. 1998; pp. 1-25.

RFC 2290: Mobile-IPv4 Configuration Option for PPP IPCP (Available at ftp://ftp.isi.edu/in-notes/rfc2290.txt); Jim Solomon and Steven Glass; Feb. 1998; pp. 1-17.

RFC 2784: Generic Routing Encapsulation (GRE) (Available at ftp://ftp.isi.edu/in-notes/rfc2784.txt); Dino Farinacci, Tony Li, Stan Hanks, David Meyer and Pual Traina; Mar. 2000; pp. 1-9.

RFC 2815: Integrated Service Mappings on IEEE 802 Networks (Available at ftp://ftp.isi.edu/in-notes/rfc2815.txt); Mick Seaman, Andrew Smith, Eric Crawley, and John Wroclawski; May 2000; pp. 1-17.

RFC 3437: Layer-Two Tunneling Protocol Extensions for PPP Link Control Protocol Negotiation (Available at ftp://ftp.isi.edu/in-notes/rfc3437.txt); W. Mark Townsley and Bill Palter; Dec. 2002; pp. 1-10.

RFC 3457: Requirements for IPsec Remote Access Scenarios (Available at ftp://ftp.isi.edu/in-notes/rfc3457.txt); Scott Kelly and Sankar Ramamoorthi, Editors; Jan. 2003; pp. 1-31.

RFC 3468: The Multiprotocl Label Switching (MPLS) Working Group decision on MPLS signaling protocols (Available at ftp://ftp.isi.edu/in-notes/rfc3468.txt); Loa Andersson and George Swallow; Feb. 2003; pp. 1-11.

RFC 3484: Default Address Selection for Internet Protocol version 6 (IPv6) (Available at ftp://ftp.isi.edu/in-notes/rfc3484.txt); Richard Draves; Feb. 2003; pp. 1-24.

RFC 3489: STUN—Simple Traversal of User Datagram Protocol (UDP) Through Network Address Translators (NATs) (Available at ftp://ftp.isi.edu/in-notes/rfc3489.txt); Jonathan Rosenberg, Joel Weinberger, Christian Huitema, and Rohan Mahy; Mar. 2003; pp. 1-47.

RFC 3496: Protocol Extension for Support of Asynchronous Transfer Mode (ATM) Service Class-aware Multiprotocl Lablel Switching (MPLS) Traffic Engineering (Available at ftp://ftp.isi.edu/in-notes/rfc3496.txt); Andrew G. Malis and Tony Hsiac; Mar. 2003; pp. 1-6.

RFC 3511: Benchmarking Methodology for Firewall Performance (Available at ftp://ftp.isi.edu/in-notes/rfc3511.txt); Brooks Hickman, David Newman, Saldju Tadjudin, and Terry Martin; Apr. 2003; pp. 1-34.

RFC 3513: Internet Protocol Version 6 (IPv6) Addressing Architecture (Available at ftp://ftp.isi.edu/in-notes/rfc3513.txt); Robert M. Hinden and Stephen E. Deering; Apr. 2003; pp. 1-26.

RFC 3518: Point-to-Point Protocol (PPP) Bridging Control Protocol (BCP) (Available at ftp://ftp.isi.edu/in-notes/rfc3518.txt); Mitsuru Higashiyama, Fred Baker, and Tawel Liao; Apr. 2003; pp. 1-40.

RFC 3519: Mobile IP Traversal of Network Address Translation (NAT) Devices (Available at ftp://ftp.isi.edu/in-notes/rfc3519.txt); Henrik Levkowetz and Sami Vaarala; Apr. 2003; pp. 1-34.

RFC 760: DOD Standard Internet Protocol (Available at ftp://ftp.isi.edu/in-notes/rfc760.txt) V; Jan. 1980; pp. i-iii, 1-42.

RFC 777: Internet Control Message Protocol (Available at ftp://ftp.isi.edu/in-notes/rfc777.txt); Jon Postel; Apr. 1981; pp. 1-14.

RFC 787: Connectionless Data Transmission Survey/Tutorial (Available at ftp://ftp.isi.edu/in-notes/rfc787.txt); A. Lyman Chapin; May 22, 1981; pp. 1-41.

RFC 791: Internet Protocol: DARPA Internet Program Protocol Specification (Available at ftp://ftp.isi.edu/in-notes/rfc791.txt); The Information Sciences Institute of the University of Southern California; Editor: Jon Postel; Sep. 1981; pp. i-iii, 1-45.

RFC 792: Internet Control Message Protocol: DARPA Internet Program Protocol Specification (Available at ftp://ftp.isi.edu/in-notes/rfc792.txt); Jon Postel; Sep. 1981; pp. 1-21.

RFC 874: A Critique of X.25 (Available at ftp://ftp.isi.edu/in-notes/rfc874.txt); M. A. Padlipsky; Sep. 1982; pp. i, 1-13.

RFC 877: A Standard for the Transmission of IP Datagrams Over Public Data Networks (Available at ftp://ftp.isi.edu/in-notes/rfc877.txt); J. T. Korb; Sep. 1983; pp. 1-2.

RFC 894: A Standard for the Transmission of IP Datagrams over Ethernet Networks (Available at ftp://ftp.isi.edu/in-notes/rfc894.txt); Charles Hornig; Apr. 1984; pp. 1-3.

RFC 895: A Standard for the Transmission of IP Datagrams over Experimental Ethernet Networks (Available at ftp://ftp.isi.edu/in-notes/rfc895.txt); Jon Postel; Apr. 1984; pp. 1-3.

RFC 948: Two Methods for the Transmission of IP Datagrams over IEEE 802.3 Networks (Available at ftp://ftp.isi.edu/in-notes/rfc948.txt); Ira Winston; Jun. 1985; pp. 0-5.

RFC 950: Internet Standard Subnetting Procedure (Available at ftp://ftp.isi.edu/in-notes/rfc950.txt); J. Mogul and Jon Postel; Aug. 1985; pp. 1-18.

RFC 1009: Requirements for Internet Gateways (Available at ftp://ftp.isi.edu/in-notes/rfc1009.txt); Robert Braden and Jon Postel; Jun. 1987; pp. 1-55.

RFC 1042: A Standard for the Transmission of IP Datagrams over IEEE 802 Networks (Available at ftp://ftp.isi.edu/in-notes/rfc1042.txt); Jon Postel and J. Reynolds; Feb. 1988; pp. 1-15.

RFC 1051: A Standard for the Transmission of IP Datagrams and ARP Packets over ARCNET Networks (Available at ftp://ftp.isi.edu/in-notes/rfc1051.txt); P. Prindeville; Mar. 1988; pp. 1-4.

RFC 1053: Telnet X.3 PAD Option (Available at ftp://ftp.isi.edu/in-notes/rfc1053.txt); S. Levy and T. Jacobson; Apr. 1988; pp. 1-21.

RFC 1055: A Nonstandard for Transmission of IP Datagrams Over Serial Lines: SLIP (Available at ftp://ftp.isi.edu/in-notes/rfc1055.txt); J. Romkey; Jun. 1988; pp. 1-6.

RFC 1086: ISO-TP0 bridge between TCP and X.25 (Available at ftp://ftp.isi.edu/in-notes/rfc1086.txt); Julian P. Onions and Marshall Rose; Dec. 1988; pp. 1-9.

RFC 1088: A Standard for the Transmission of IP Datagrams over NetBIOS Networks (Available at ftp://ftp.isi.edu/in-notes/rfc1088.txt); Leo J. McLaughlin III; Feb. 1989; pp. 1-3.

RFC 2341: Cisco Layer Two Forwarding (Protocol) "L2F" (Available at ftp://ftp.isi.edu/in-notes/rfc2341.txt); Tim Kolar, Morgan Littlewood, and Andy Valencia; May 1998; pp. 1-29.

RFC 2356: Sun's Skip Firewall Traversal for Mobile IP (Available at ftp://ftp.isi.edu/in-notes/rfc2356.txt); Gabriel E. Montenegro and Vipul Gupta; Jun. 1998; pp. 1-24.

RFC 2363: PPP Over FUNI (Available at ftp://ftp.isi.edu/in-notes/rfc2363.txt); George Gross, Manu Kaycee, Arthur Lin, Andrew Malis, and John Stephens; Jul. 1998; pp. 1-12.

RFC 2364: PPP Over AAL5 (Available at ftp://ftp.isi.edu/in-notes/rfc2364.txt); George Gross, Manu Kaycee, Arthur Lin, Andrew Malis, and John Stephens; Jul. 1998; pp. 1-12.

RFC 2373: IP Version 6 Addressing Architecture (Available at ftp://ftp.isi.edu/in-notes/rfc2373.txt); Robert M. Hinden and Stephen E. Deering; Jul. 1998; pp. 1-26.
RFC 2374: An IPv6 Aggregatable Global Unicast Address Format (Available at ftp://ftp.isi.edu/in-notes/rfc2374.txt); Robert M. Hinden, Mike O'Dell, and Stephen E. Deering; Jul. 1998; pp. 1-12.
RFC 2390: Inverse Address Resolution Protocol (Available at ftp://ftp.isi.edu/in-notes/rfc2390.txt); Terry Bradley, Caralyn Brown, and Andrew Malis; Sep. 1998; pp. 1-10.
RFC 2391: Load Sharing using IP Network Address Translation (LSNAT) (Available at ftp://ftp.isi.edu/in-notes/rfc2391.txt); Pyda Srisuresh and Der-hwa Gan; Aug. 1998; pp. 1-18.
RFC 2401: Security Architecture for the Internet Protocol (Available at ftp://ftp.isi.edu/in-notes/rfc2401.txt); Stephen Kent and Randall Atkinson; Nov. 1998; pp. 1-66.
RFC 2402: IP Authentication Header (Available at ftp://ftp.isi.edu/in-notes/rfc2402.txt); Stephen Kent and Randall Atkinson; Nov. 1998; pp. 1-22.
RFC 2406: IP Encapsulating Security Payload (ESP) (Available at ftp://ftp.isi.edu/in-notes/rfc2406.txt); Stephen Kent and Randall Atkinson; Nov. 1998; pp. 1-22.
RFC 2411: IP Security Document Roadmap (Available at ftp://ftp.isi.edu/in-notes/rfc2411.txt); Rodney Thayer, Naganand Doraswamy, and Rob Glenn; Nov. 1998; pp. 1-11.
RFC 2427: Multiprotocol Interconnect over Frame Relay (Available at ftp://ftp.isi.edu/in-notes/rfc2427.txt); Caralyn Brown and Andrew Malis; Sep. 1998; pp. 1-34.
RFC 2428: FTP Extensions for IPv6 and NATs (Available at ftp://ftp.isi.edu/in-notes/rfc2428.txt); Mark Allman, Shawn Ostermann, and Craig Metz; Sep. 1998; pp. 1-8.
RFC 2460: Internet Protocol, Version 6 (IPv6) Specification (Available at ftp://ftp.isi.edu/in-notes/rfc2460.txt); Stephen E. Deering and Robert M. Hinden; Dec. 1998; pp. 1-39.
RFC 2461: Neighbor Discovery for IP Version 6 (IPv6) (Available at ftp://ftp.isi.edu/in-notes/rfc2461.txt); Thomas Narten, Erik Nordmark, and William Allen Simpson; Dec. 1998; pp. 1-93.
RFC 2463: Internet Control Message Protocol (ICMPv6) for the Internet Protocol Version 6 (IPv6) Specification (Available at ftp://ftp.isi.edu/in-notes/rfc2463.txt); Alex Conta and Stephen Deering; Dec. 1998; pp. 1-18.
RFC 2464: Transmission of IPv6 Packets over Ethernet Networks (Available at ftp://ftp.isi.edu/in-notes/rfc2464.txt); Matt Crawford; Dec. 1998; pp. 1-7.
RFC 1814: Unique Addresses are Good (Available at ftp://ftp.isi.edu/in-notes/rfc1814.txt); Elise Gerich; Jun. 1995; pp. 1-3.
RFC 1825: Security Architecture for the Internet Protocol (Available at ftp://ftp.isi.edu/in-notes/rfc1825.txt); Randall Atkinson; Aug. 1995; pp. 1-22.
RFC 1826: IP Authentication Header (Available at ftp://ftp.isi.edu/in-notes/rfc1826.txt); Randall Atkinson; Aug. 1995; pp. 1-13.
RFC 1827: IP Encapsulating Security Payload (ESP) (Available at ftp://ftp.isi.edu/in-notes/rfc1827.txt); Randall Atkinson; Aug. 1995; pp. 1-12.
RFC 1841: PPP Network Control Protocol for LAN Extension (Available at ftp://ftp.isi.edu/in-notes/rfc1841.txt); Joelle Bafile Chapman, Dave Coli, Andy Harvey, Bent Jensen, and Kevin Rowett; Sep. 1995; pp. 1-66.
RFC 1853: IP in IP Tunneling (Available at ftp://ftp.isi.edu/in-notes/rfc1853.txt); William Allen Simpson; Oct. 1995; pp. 1-8.
RFC 1877: PPP Internet Protocol Control Protocol Extensions for Name Server Addresses (Available at ftp://ftp.isi.edu/in-notes/rfc1877.txt); Steve Cobb; Dec. 1995; pp. 1-6.
RFC 1883: Internet Protocol, Version 6 (IPv6) Specification (Available at ftp://ftp.isi.edu/in-notes/rfc1883.txt); Stephen E. Deering and Robert M. Hinden; Dec. 1995; pp. 1-37.
RFC 1884: IP Version 6 Addressing Architecture (Available at ftp://ftp.isi.edu/in-notes/rfc1884.txt); Robert M. Hinden and Stephen E. Deering, Editors; Dec. 1995; pp. 1-18.
RFC 1885: Internet Control Message Protocol (ICMPv6) for the Internet Protocol Version 6 (IPv6) Specification (Available at ftp://ftp.isi.edu/in-notes/rfc1885.txt); Alex Conta and Stephen Deering; Dec. 1995; pp. 1-20.
RFC 1887: An Architecture for IPv6 Unicast Address Allocation (Available at ftp://ftp.isi.edu/in-notes/rfc1887.txt); Yakov Rekhter and Tony Li, Editors; Dec. 1995; pp. 1-26.
RFC 1897: IPv6 Testing Address Allocation (Available at ftp://ftp.isi.edu/in-notes/rfc1897.txt); Robert M. Hinden and Jon Postel; Jan. 1996; pp. 1-4.
RFC 1918: Address Allocation for Private Internets (Available at ftp://ftp.isi.edu/in-notes/rfc1918.txt); Yakov Rekhter, Robert G Moskowitz, Daniel Karrenberg, Geert Jan de Groot, and Eliot Lear; Feb. 1996; pp. 1-9.
RFC 1919: Classical versus Transparent IP Proxies (Available at ftp://ftp.isi.edu/in-notes/rfc1919.txt); Marc Chatel; Mar. 1996; pp. 1-35.
RFC 1928: Socks Protocol Version 5 (Available at ftp://ftp.isi.edu/in-notes/rfc1928.txt); Marcus Leech, M. Ganis, Y. Lee, R. Kuris, D. Koblas, and L. Jones; Mar. 1996; pp. 1-9.
RFC 1929: Username/Password Authentication for Socks V5 (Available at ftp://ftp.isi.edu/in-notes/rfc1929.txt); Marcus Leech; Mar. 1996; pp. 1-2.
RFC 1932: IP over ATM: A Framework Document (Available at ftp://ftp.isi.edu/in-notes/rfc1932.txt); Robert G. Cole, David H. Shur, and Curtis Villamizar; Apr. 1996; pp. 1-31.
RFC 1933: Transition Mechanisms for IPv6 Hosts and Routers (Available at ftp://ftp.isi.edu/in-notes/rfc1933.txt); Robert E. Gilligan and Erik Nordmark; Apr. 1996; pp. 1-22.
RFC 1335: A Two-Tier Address Structure for the Internet: A Solution to the Problem of Address Space Exhaustion (Available at ftp://ftp.isi.edu/in-notes/rfc1335.txt); Zheng Wang and Jon Crowcroft; May 1992; pp. 1-7.
RFC 1356: Multiprotocol Interconnect on X.25 and ISDN in the Packet Mode (Available at ftp://ftp.isi.edu/in-notes/rfc1356.txt); Andrew G. Malis, David Robinson, and Robert L. Ullmann; Aug. 1992; pp. 1-14.
RFC 1376: The PPP DECnet Phase IV Control Protocol (DNCP) (Available at ftp://ftp.isi.edu/in-notes/rfc1376.txt); Steven J. Senum; Nov. 1992; pp. 1-6.
RFC 1377: The PPP OSI Network Layer Control Protocol (OSINLCP) (Available at ftp://ftp.isi.edu/in-notes/rfc1377.txt); Dave Katz; Nov. 1992; pp. 1-10.
RFC 1378: The PPP AppleTalk Control Protocol (ATCP) (Available at ftp://ftp.isi.edu/in-notes/rfc1378.txt); Brad Parker; Nov. 1992; pp. 1-16.
RFC 1381: SNMP MIB Extension for X.25 LAPB (Available at ftp://ftp.isi.edu/in-notes/rfc1381.txt); Dean D. Throop and Fred Baker; Nov. 1992; pp. 1-33.
RFC 1382: SNMP MIB Extension for the X.25 Packet Layer (Available at ftp://ftp.isi.edu/in-notes/rfc1382.txt); Dean D. Throop, Editor; Nov. 1992; pp. 1-69.
RFC 1390: Transmission of IP and ARP over FDDI Networks (Available at ftp://ftp.isi.edu/in-notes/rfc1390.txt); Dave Katz; Jan. 1993; pp. 1-11.
RFC 1393: Traceroute Using an IP Option (Available at ftp://ftp.isi.edu/in-notes/rfc1393.txt); Gary Scott Malkin; Jan. 1993; pp. 1-7.
RFC 1479: Inter-Domain Policy Routing Protocol Specification: Version 1 (Available at ftp://ftp.isi.edu/in-notes/rfc1479.txt); Martha Steenstrup; Jul. 1993; pp. 1-108.
RFC 1701: Generic Routing Encapsulation (GRE) (Available at ftp://ftp.isi.edu/in-notes/rfc1701.txt); Stan Hanks, Tony Li, Dino Farinacci, and Paul Traina; Oct. 1994; pp. 1-8.
RFC 1702: Generic Routing Encapsulation over IPv4 networks (Available at ftp://ftp.isi.edu/in-notes/rfc1702.txt); Stan Hanks, Tony Li, Dino Farinacci, and Paul Traina; Oct. 1994; pp. 1-4.
RFC 1717: The PPP Multilink Protocol (MP) (Available at ftp://ftp.isi.edu/in-notes/rfc1717.txt); Keith Sklower, Brian Lloyd, Glenn McGregor, and Dave Carr; Nov. 1994; pp. 1-21.
RFC 1739: A Primer On Internet and TCP/IP Tools (Available at ftp://ftp.isi.edu/in-notes/rfc1739.txt); Gary C. Kessler and Steven D. Shapard; Dec. 1994; pp. 1-46.
RFC 1752: The Recommendation for the IP Next Generation Protocol (Available at ftp://ftp.isi.edu/in-notes/rfc1752.txt); Scott Bradner and Allison Mankin; Jan. 1995; pp. 1-52.

RFC 1755: ATM Signaling Support for IP over ATM (Available at ftp://ftp.isi.edu/in-notes/rfc1755.txt);Maryann Perez Maher, Fong-Ching Liaw, and Allison Mankin; Feb. 1995; pp. 1-32.

RFC 1762: The PPP DECnet Phase IV Control Protocol (DNCP) (Available at ftp://ftp.isi.edu/in-notes/rfc1762.txt); Steven J. Senum; Mar. 1995; pp. 1-7.

RFC 1763: The PPP Banyan Vines Control Protocol (BVCP) (Available at ftp://ftp.isi.edu/in-notes/rfc1763.txt); Steven J. Senum; Mar. 1995; pp. 1-10.

RFC 1122: Requirements for Internet Hosts—Communication Layers (Available at ftp://ftp.isi.edu/in-notes/rfc1122.txt); The Internet Engineering Task Force; Editor: Robert Braden; Oct. 1989; pp. 1-116.

RFC 1134: The Point-to-Point Protocol: A Proposal for Multi-Protocol Transmission of Datagrams Over Point-to-Point Links (Available at ftp://ftp.isi.edu/in-notes/rfc1134.txt); Drew D. Perkins; Nov. 1989; pp. 1-38.

RFC 1171: The Point-to-Point Protocol for the Transmission of Multi-Protocol Datagrams Over Point-to-Point Links (Available at ftp://ftp.isi.edu/in-notes/rfc1171.txt); Drew D. Perkins; Jul. 1990; pp. 1-48.

RFC 1172: The Point-to-Point Protocol (PPP) Initial Configuration Options (Available at ftp://ftp.isi.edu/in-notes/rfc1172.txt); Drew D. Perkins and Russ Hobby; Jul. 1990; pp. 1-38.

RFC 1188: A Proposed Standard for the Transmission of IP Datagrams over FDDI Networks (Available at ftp://ftp.isi.edu/in-notes/rfc1188.txt); Dave Katz; Oct. 1990; pp. 1-11.

RFC 1201: Transmitting IP Traffic over ARCNET Networks (Available at ftp://ftp.isi.edu/in-notes/rfc1201.txt); Don Provan; Feb. 1991; pp. 1-7.

RFC 1209: The Transmission IP Datagrams over the SMDS Service (Available at ftp://ftp.isi.edu/in-notes/rfc1209.txt); Dave Piscitello and Joseph Lawrence; Mar. 1991; pp. 1-11.

RFC 1220: Point-to-Point Protocol Extensions for Bridging (Available at ftp://ftp.isi.edu/in-notes/rfc1220.txt); Fred Baker; Apr. 1991; pp. 1-18.

RFC 1226: Internet Protocol Encapsulation of AX.25 Frames (Available at ftp://ftp.isi.edu/in-notes/rfc1226.txt); Brian Kantor; May 1991; pp. 1-2.

RFC 1234: Tunneling IPX Traffic through IP Networks (Available at ftp://ftp.isi.edu/in-notes/rfc1234.txt); Don Provan; Jun. 1991; pp. 1-6.

RFC 1241: A Scheme for an Internet Encapsulation Protocol: Version 1 (Available at ftp://ftp.isi.edu/in-notes/rfc1241.txt); Robert A. Woodburn and David L. Mills; Jul. 1991; pp. 1-17.

RFC 1242: Benchmarking Terminology for Network Interconnection Devices (Available at ftp://ftp.isi.edu/in-notes/rfc1242.txt); Scott Bradner, Editor; Jul. 1991; pp. 1-12.

RFC 1256: ICMP Router Discovery Messages (Available at ftp://ftp.isi.edu/in-notes/rfc1256.txt); Stephen E. Deering, Editor; Sep. 1991; pp. 1-19.

RFC 1293: Inverse Address Resolution Protocol (Available at ftp://ftp.isi.edu/in-notes/rfc1293.txt); Terry Bradley and Caralyn Brown; Jan. 1992; pp. 1-6.

RFC 1294: Multiprotocol Interconnect over Frame Relay (Available at ftp://ftp.isi.edu/in-notes/rfc1294.txt); Terry Bradley, Caralyn Brown, and Andrew G. Malis; Jan. 1992; pp. 1-28.

RFC 1326: Mutual Encapsulation Considered Dangerous (Available at ftp://ftp.isi.edu/in-notes/rfc1326.txt);Paul Tsuchiya; May 1992; pp. 1-5.

RFC 1329: Thoughts on Address Resolution for Dual MAC FDDI Networks (Available at ftp://ftp.isi.edu/in-notes/rfc1329.txt); Peter Kuehn; May 1992; pp. 1-28.

RFC 1331: The Point-to-Point Protocol (PPP) for the Transmission of Multi-protocol Datagrams over Point-to-Point Links (Available at ftp://ftp.isi.edu/in-notes/rfc1331.txt);William Allen Simpson; May 1992; pp. 1-66.

RFC 3142: An IPv6-to-IPv4 Transport Relay Translator (Available at ftp://ftp.isi.edu/in-notes/rfc3142.txt); Jun-ichiro Itojun Hagino and Kazu Yamamoto; Jun. 2001; pp. 1-11.

RFC 3177: IAB/IESG Recommendations on IPv6 Address Allocations to Sites (Available at ftp://ftp.isi.edu/in-notes/rfc3177.txt); Internet Architecture Board (IAB) and Internet Engineering Steering Group (IESG); Sep. 2001; pp. 1-10.

RFC 3193: Securing L2TP using IPsec (Available at ftp://ftp.isi.edu/in-notes/rfc3193.txt); Baiju V. Patel, Bernard Aboba, William Dixon, Glen Zorn, and Skip Booth; Nov. 2001; pp. 1-28.

RFC 3232: Assigned Nos. RFC 1700 is Replaced by an On-line Database (Available at ftp://ftp.isi.edu/in-notes/rfc3232.txt); Joyce K. Reynolds, Editor; Jan. 2002; pp. 1-3.

RFC 3235: Network Address Translator (NAT)-Friendly Application Design Guidelines (Available at ftp://ftp.isi.edu/in-notes/rfc3235.txt); Daniel Senie; Jan. 2002; pp. 1-13.

RFC 3257: Stream Control Transmission Protocol Applicability Statement (Available at ftp://ftp.isi.edu/in-notes/rfc3257.txt); Lode Coene; Apr. 2002; pp. 1-13.

RFC 3286: An Introduction to the Stream Control Transmission Protocol (SCTP) (Available at ftp://ftp.isi.edu/in-notes/rfc3286.txt); Lyndon Ong and John Yoakum; May 2002; pp. 1-10.

RFC 3301: Layer Two Tunnelling Protocol (L2TP): ATM access network extension (Available at ftp://ftp.isi.edu/in-notes/rfc3301.txt); Yves T'joens, Paolo Crivellari, and Bernard Sales; Jun. 2002; pp. 1-19.

RFC 3303: Middlebox communication architecture and framework (Available at ftp://ftp.isi.edu/in-notes/rfc3303.txt); Pyda Srisuresh, Jiri Kuthan, Jonathan Rosenberg, Andrew Molitor, and Abdallah Rayhan; Aug. 2002; pp. 1-34.

RFC 3304: Middlebox Communications (midcom) Protocol Requirements (Available at ftp://ftp.isi.edu/in-notes/rfc3304.txt); Richard Swaie, Paul Sijben, Philip Mart, Scott Brim, and Melinda Shore; Aug. 2002; pp. 1-9.

RFC 3308: Layer Two Tunneling Protocol (L2TP) Differentiated Services Extension (Available at ftp://ftp.isi.edu/in-notes/rfc3308.txt); Pat R. Calhoun, Wei Luo, Danny McPherson, and Kan Peirce; Nov. 2002; pp. 1-10.

RFC 3309: Stream Control Transmission Protocol (SCTP) Checksum Change (Available at ftp://ftp.isi.edu/in-notes/rfc3309.txt); Jonathan Stone, Randall R. Stewart, and Douglas Otis; Sep. 2002; pp. 1-17.

RFC 3336: PPP Over Asynchronous Transfer Mode Adaptation Layer 2 (AAL2) (Available at ftp://ftp.isi.edu/in-notes/rfc3336.txt); Bruce Thompson, Tmima Koren, and Bruce Buffam; Dec. 2002; pp. 1-16.

RFC 3337: Class Extensions for PPP over Asynchronous Transfer Mode Adaptation Layer 2 (AAL2) (Available at ftp://ftp.isi.edu/in-notes/rfc3337.txt); Bruce Thompson, Bruce Buffam, and Tmima Koren; Dec. 2002; pp. 1-7.

RFC 3346: Applicability Statement for Traffic Engineering with MPLS (Available at ftp://ftp.isi.edu/in-notes/rfc3346.txt); Jim Boyle, Vijay Gill, Alan Hannan, Dave Cooper, Daniel O. Awduche, Blaine Christian, and Wai Sum Lai; Aug. 2002; pp. 1-14.

RFC 3348: Layer Two Tunneling Protocol (L2TP) Internet Assigned Numbers Authority (IANA) Considerations Update (Available at ftp://ftp.isi.edu/in-notes/rfc3348.txt); Mike Gahms and Raymond Cheng; Jul. 2002; pp. 1-6.

RFC 3378: EtherIP: Tunneling Ethernet Frames in IP Datagrams (Available at ftp://ftp.isi.edu/in-notes/rfc3378.txt); Russell Housley and Scott Hollenbeck; Sep. 2002; pp. 1-9.

RFC 3424: IAB Considerations for UNilateral Self-Address Fixing (UNSAF) Across Network Address Translation (Available at ftp://ftp.isi.edu/in-notes/rfc3424.txt); Leslie Daigle, Editor; Nov. 2002; pp. 1-9.

RFC 2544: Benchmarking Methodology for Network Interconnect Devices (Available at ftp://ftp.isi.edu/in-notes/rfc2544.txt); Scott Bradner and Jim McQuaid, Editors; Mar. 1999; pp. 1-31.

RFC 2547: BGP/MPLS VPNs (Available at ftp://ftp.isi.edu/in-notes/rfc2547.txt); Eric C. Rosen and Yakov Rekhter; Mar. 1999; pp. 1-25.

RFC 2590: Transmission of IPv6 Packets over Frame Relay Networks Specification (Available at ftp://ftp.isi.edu/in-notes/rfc2590.txt); Alex Conta, Andrew Malis, and Martin Mueller; May 1999; pp. 1-19.

RFC 2615: PPP over SONET/SDH (Available at ftp://ftp.isi.edu/in-notes/rfc2615.txt); Andrew G. Malis and William Allen Simpson; Jun. 1999; pp. 1-10.

RFC 2637: Point-to-Point Tunneling Protocol (PPTP) (Available at ftp://ftp.isi.edu/in-notes/rfc2637.txt); Kory Hamzeh, Gurdeep Singh Pall, William Verthein, Jeff Taarud, W. Andrew Little, and Glen Zorn; Jul. 1999; pp. 1-57.

RFC 2647: Benchmarking Terminology for Firewall Performance (Available at ftp://ftp.isi.edu/in-notes/rfc2647.txt); David Newman; Aug. 1999; pp. 1-26.

RFC 2661: Layer Two Tunneling Protocol "L2TP" (Available at ftp://ftp.isi.edu/in-notes/rfc2661.txt); Gurdeep Singh Pall, Bill Palter, Allan Rubens, W. Mark Townsley, Andrew J. Valencia, and Glen Zorn; Aug. 1999; pp. 1-80.

RFC 2663: IP Network Address Translator (NAT) Terminology and Considerations (Available at ftp://ftp.isi.edu/in-notes/rfc2663.txt); Pyda Srisuresh and Matt Holdrege; Aug. 1999; pp. 1-30.

RFC 2684: Multiprotocol Encapsulation over ATM Adaptation Layer 5 (Available at ftp://ftp.isi.edu/in-notes/rfc2684.txt); Dan Grossman and Juha Heinanen; Sep. 1999; pp. 1-23.

RFC 2685: Virtual Private Networks Identifier (Available at ftp://ftp.isi.edu/in-notes/rfc2685.txt); Barbara A. Fox and Bryan Gleeson; Sep. 1999; pp. 1-6.

RFC 2694: DNS extensions to Network Address Translators (DNS_ALG) (Available at ftp://ftp.isi.edu/in-notes/rfc2694.txt); Pyda Srisuresh, George Tsirtsis, Praveen Akkiraju, and Andy Heffeman; Sep. 1999; pp. 1-29.

RFC 2702: Requirements for Traffic Engineering Over MPLS (Available at ftp://ftp.isi.edu/in-notes/rfc2702.txt); Daniel O. Awduche, Joe Malcolm, Johnson Agogbua; Mike O'Dell, and Jim McManus; Sep. 1999; pp. 1-29.

RFC 2709: Security Model with Tunnel-mode IPsec for NAT Domains (Available at ftp://ftp.isi.edu/in-notes/rfc2709.txt); Pyda Srisuresh; Oct. 1999; pp. 1-11.

RFC 2761: Terminology for ATM Benchmarking (Available at ftp://ftp.isi.edu/in-notes/rfc2761.txt); Jeffrey Dunn and Cynthia Martin; Feb. 2000; pp. 1-32.

RFC 2764: A Framework for IP Based Virtual Private Networks (Available at ftp://ftp.isi.edu/in-notes/rfc2764.txt); Bryan Gleeson, Juha Heinanen, Arthur Lin, Grenville Armitage, and Andrew G. Malis; Feb. 2000; pp. 1-62.

RFC 2765: Statless IP/ICMP Translation Algorithm (SIIT) (Available at ftp://ftp.isi.edu/in-notes/rfc2765.txt); Eric Nordmark; Feb. 2000; pp. 1-26.

RFC 2766: Network Address Translation—Protocol Transmission (NAT-PT) (Available at ftp://ftp.isi.edu/in-notes/rfc2766.txt); George Tsitsis and Pyda Srisuresh; Feb. 2000, pp. 1-21.

RFC 2775: Internet Transparency (Available at ftp://ftp.isi.edu/in-notes/rfc2775.txt); Brian E. Carpenter; Feb. 2000; pp. 1-18.

RFC 1970: Neighbor Discovery for IP Version 6 (IPv6) (Available at ftp://ftp.isi.edu/in-notes/rfc1970.txt); Erik Nordmark, Thomas Narten, and William Allen Simpson; Aug. 1996; pp. 1-82.

RFC 1972: A Method for the Transmission of IPv6 Packets over Ethernet Networks (Available at ftp://ftp.isi.edu/in-notes/rfc1942.txt); Matt Crawford; Aug. 1996; pp. 1-4.

RFC 1973: PPP in Frame Relay (Available at ftp://ftp.isi.edu/in-notes/rfc1973.txt); William Allen Simpson; Jun. 1996; pp. 1-8.

RFC 1989: PPP Link Quality Monitoring (Available at ftp://ftp.isi.edu/in-notes/rfc1989.txt); William Allen Simpson; Aug. 1996; pp. 1-16.

RFC 1990: The PPP Multilink Protocol (MP) (Available at ftp://ftp.isi.edu/in-notes/rfc1990.txt); Keith Sklower, Brian Lloyd, Glenn McGregor, Dave Carr, and Tom Coradetti; Aug. 1996; pp. 1-24.

RFC 2003: IP Encapsulation within IP (Available at ftp://ftp.isi.edu/in-notes/rfc2003.txt); Charles Perkins; Oct. 1998; pp. 1-14.

RFC 2004: Minimal Encapsulation within IP (Available at ftp://ftp.isi.edu/in-notes/rfc2004.txt); Charles Perkins; Oct. 1996; pp. 1-6.

RFC 2019: A Method for the Transmission of IPv6 Packets over FDDI Networks (Available at ftp://ftp.isi.edu/in-notes/rfc2019.txt); Matt Crawford; Oct. 1996; pp. 1-6.

RFC 2023: IP Version 6 over PPP (Available at ftp://ftp.isi.edu/in-notes/rfc2023.txt); Dimitry Haskin and Ed Allen; Oct. 1996; pp. 1-10.

RFC 2043: The PPP SNA Control Protocol (SNACP) (Available at ftp://ftp.isi.edu/in-notes/rfc2043.txt); Andrew M. Fuqua; Oct. 1996; pp. 1-7.

RFC 2073: An IPv6 Provider-Based Unicast Address Format (Available at ftp://ftp.isi.edu/in-notes/rfc2073.txt); Yakov Rekhter, Peter Lothberg, Robert M. Hinden, Stephen E. Deering, and Jon Postal, Editors; Jan. 1997; pp. 1-7.

RFC 2097: The PPP NetBIOS Frames Control Protocol (NBFCP) (Available at ftp://ftp.isi.edu/in-notes/rfc2097.txt); Gurdeep Singh Pall; Jan. 1997; pp. 1-13.

RFC 2101: IPv4 Address Behaviour Today (Available at ftp://ftp.isi.edu/in-notes/rfc2101.txt); Brian E. Carpenter, Jon Crowcoft, and Yakov Rekhter; Feb. 1997; pp. 1-13.

RFC 2105: Cisco Systems' Tag Switching Architecture Overview (Available at ftp://ftp.isi.edu/in-notes/rfc2105.txt); Yakov Rekhter, Bruce Davie, Dave Katz, Eric Rosen, and George Swallow; Feb. 1997; pp. 1-13.

RFC 2107: Ascend Tunnel Management Protocol—ATMP (Available at ftp://ftp.isi.edu/in-notes/rfc2107.txt); Kory Hamzeh; Feb. 1997; pp. 1-21.

RFC 2151: A Primer On Internet and TCP/IP Tools and Utilities (Available at ftp://ftp.isi.edu/in-notes/rfc2151.txt); Gary C. Kessler and Steven D. Shepard; Jun. 1997; pp. 1-52.

RFC 2185: Routing Aspects Of IPv6 Transition (Available at ftp://ftp.isi.edu/in-notes/rfc2185.txt); Ross Callon and Dimitry Haskin; Sep. 1997; pp. 1-13.

RFC 2225: Classical IP and ARP over ATM (Available at ftp://ftp.isi.edu/in-notes/rfc2225.txt); Mark Laubach and Joel Halpern; Apr. 1998; pp. 1-28.

RFC 1483: Multiprotocol Encapsulation over ATM Adaptation Layer 5 (Available at ftp://ftp.isi.edu/in-notes/rfc1483.txt); Juha Heinanen; Jul. 1993; pp. 1-16.

RFC 1490: Multiprotocol Interconnect over Frame Relay (Available at ftp://ftp.isi.edu/in-notes/rfc1490.txt); Terry Bradley, Caralyn Brown, and Andrew G. Malis; Jul. 1993; pp. 1-35.

RFC 1547: Requirements for an Internet Standard Point-to-Point Protocol (Available at ftp://ftp.isi.edu/in-notes/rfc1547.txt); Drew Perkins; Dec. 1993; pp. 1-21.

RFC 1548: The Point-to-Point Protocol (PPP) (Available at ftp://ftp.isi.edu/in-notes/rfc1548.txt); William Allen Simpson; Dec. 1993; pp. 1-53.

RFC 1549: PPP in HDLC Framing (Available at ftp://ftp.isi.edu/in-notes/rfc1549.txt); William Allen Simpson, Editor; Dec. 1993; pp. 1-18.

RFC 1552: The PPP Internetwork Packet Exchange Control Protocol (IPXCP) (Available at ftp://ftp.isi.edu/in-notes/rfc1552.txt); William Allen Simpson; Dec. 1993; pp. 1-16.

RFC 1577: Classical IP and ARP over ATM (Available at ftp://ftp.isi.edu/in-notes/rfc1577.txt); Mark Laubach; Jan. 1994; pp. 1-17.

RFC 1579: Firewall-Friendly FTP (Available at ftp://ftp.isi.edu/in-notes/rfc1579.txt); Steven M. Bellovin; Feb. 1994; pp. 1-4.

RFC 1597: Address Allocation for Private Internets (Available at ftp://ftp.isi.edu/in-notes/rfc1597.txt); Yakov Rekhter, Robert G Moskowitz, Daniel Karrenberg, and Geert Jan de Groot; Mar. 1994; pp. 1-8.

RFC 1598: PPP in X.25 (Available at ftp://ftp.isi.edu/in-notes/rfc1598.txt); William Allen Simpson; Mar. 1994; pp. 1-7.

RFC 1613: cisco Systems X.25 over TCP (XOT) (Available at ftp://ftp.isi.edu/in-notes/rfc1613.txt); James R. Forster, Greg Satz, Gilbert Glick, and Bob Day; May 1994; pp. 1-13.

RFC 1618: PPP over ISDN (Available at ftp://ftp.isi.edu/in-notes/rfc1618.txt); William Allen Simpson; May 1994; pp. 1-6.

RFC 1619: PPP over SONET/SDH (Available at ftp://ftp.isi.edu/in-notes/rfc1619.txt); William Allen Simpson; May 1994; pp. 1-4.

RFC 1627: Network 10 Considered Harmful (Some Practices Shouldn't be Codified) (Available at ftp://ftp.isi.edu/in-notes/rfc1627.txt); Eliot Lear, Erik Fair, Dave Crocker, and Thomas Kessler; Jul. 1994; pp. 1-8.

RFC 1631: The IP Network Address Translator (NAT) (Available at ftp://ftp.isi.edu/in-notes/rfc1631.txt); Kjeld Borch Egevang and Paul Francis; May 1994; pp. 1-10.

RFC 1638: PPP Bridging Control Protocol (BCP) (Available at ftp://ftp.isi.edu/in-notes/rfc1638.txt); Fred Baker and Rich Bowen, Editors; Jun. 1994; pp. 1-28.

RFC 1661: The Point-to-Point Protocol (PPP) (Available at ftp://ftp.isi.edu/in-notes/rfc1661.txt); William Allen Simpson; Jul. 1994; pp. 1-52.

RFC 1662: PPP in HDLC-like Framing (Available at ftp://ftp.isi.edu/in-notes/rfc1662.txt); William Allen Simpson; Jul. 1994; pp. 1-25.

* cited by examiner

AUTOMATIC DISCOVERY OF NETWORK NODE ADDRESSES

CROSS-REFERENCE TO RELATED PATENT APPLICATIONS

This present application claims priority to several co-pending U.S. provisional applications that were all filed on Jun. 24, 2002 of which is incorporated by reference in its entirety herein. The co-pending U.S. provisional applications are:

| | |
|---|---|
| 60/391,098 | "Auto Topology Discover Method for Layer 3 Networks" |
| 60/391,121 | "Method for Automatic Discovery of Network Core Type" |
| 60/391,053 | "Method for Determination of Virtual Circuit Characteristics in Layer 3 Networks" |

FIELD OF THE INVENTION

The present invention relates generally to computer network architecture, and more particularly, to discovery of addresses for nodes on a computer network.

DESCRIPTION OF THE RELATED ART

In order for two devices to communicate with each other over a computer network, two conditions must be met. One, a communication path must be provided which links the two nodes, a condition known as "reachability." Two, the first device must know the network address of the second device, and vice-versa. The first condition is easily met as a result of the design of the network itself and the configuration of the network by the network administrator. The second condition can be met by a variety of mechanisms.

One way is for the network administrator to provide each device with its own list of network addresses of reachable nodes. This could be done through a configuration file, a command line interface, or a network management system such as SNMP. However, this mechanism is not feasible for networks which contain dozens or even hundreds of nodes.

Another way is for a device to advertise its own network address to other reachable nodes by transmitting on the network using a broadcast or multicast address. A broadcast address is a single well-known address which all network nodes are aware of and can listen on. A multicast address is one of a group of well-known addresses which all network nodes are aware of and can listen on. Therefore, a node listening on either the broadcast address or one of the multicast addresses can learn the address of the sender without knowing the sender's address ahead of time. However, for a large scale network with hundreds of nodes broadcasting, this mechanism places a heavy burden on the nodes which receive large numbers of broadcast packets.

In a variation on the first mechanism, the network administrator maintains only one list of network addresses for reachable nodes, on a particular "directory services" device. Other devices then contact the directory services device to discover the network addresses of other nodes.

Each of these solutions is appropriate for a different environment. The first solution is very simple to implement and works for a very small number of nodes. The second solution, implemented by protocols such as RIP (Routing Information Protocol) and OSPF (Open Shortest Path First), is used as a discovery mechanism between routers. The last solution, implemented by protocols such as LDAP (Lightweight Directory Access Protocol) and DNS (Domain Name Service), is used as a discovery mechanism for applications, such as Windows Explorer, to discover information about users, servers, printers, and other network devices.

In yet another environment, the network has a large enough number of nodes to make the first mechanism (each device maintaining its own list of reachable nodes) not feasible. In this environment, an increase in broadcast traffic is deemed to be undesirable. Finally, this environment supports the execution of a software application on various nodes, and within this software application, it is undesirable to provide "full mesh" connectivity such that each node communicates with each other node. Within this software, it is instead desirable to allow certain nodes to communicate with certain other nodes, in a manner which is controllable by the network administrator. A directory services solution is more complicated than necessary in this particular environment.

Therefore, there is a need for improved systems and methods which address these and other shortcomings of the prior art.

SUMMARY OF THE INVENTION

The present invention provides systems and methods for automatic discovery of network addresses. Briefly described, in architecture, one embodiment of the apparatus, among others, comprises: announcer logic; listener logic; and forwarder logic. The announcer logic is configured to transmit a node address and a forward counter associated with each known node in a list, if the forward counter is greater than zero, to all nodes in the list having a static type. The listener logic is configured to receive an announcement packet and to add to the list of known nodes at least one new node. The node address and the forward counter of the new node correspond to the announcement packet, and the new node has a discovered type. The forwarder logic is configured to transmit the node address and the forward counter associated with the new node, if the forward counter is greater than zero, to all known nodes in the list.

One embodiment of a method, among others, can be broadly summarized by the following steps: initializing a known node list; transmitting to all known nodes, a node address and a forward counter associated with each known node, if the forward counter is greater than zero; receiving from the network an announcement packet; adding to a list of discovered nodes at least one new discovered node, where the discovered node comprises a node address and a forward counter corresponding to the announcement packet; and transmitting to all known nodes and all discovered nodes, the node address and the forward counter associated with each known node, if the forward counter is greater than zero.

Other systems, methods, features, and/or advantages of the present invention will be or become apparent to one with skill in the art upon examination of the following drawings and detailed description. It is intended that all such additional systems, methods, features, and/or advantages be included within this description, be within the scope of the present invention, and be protected by the accompanying claims.

DETAILED DESCRIPTION

Figure 1:
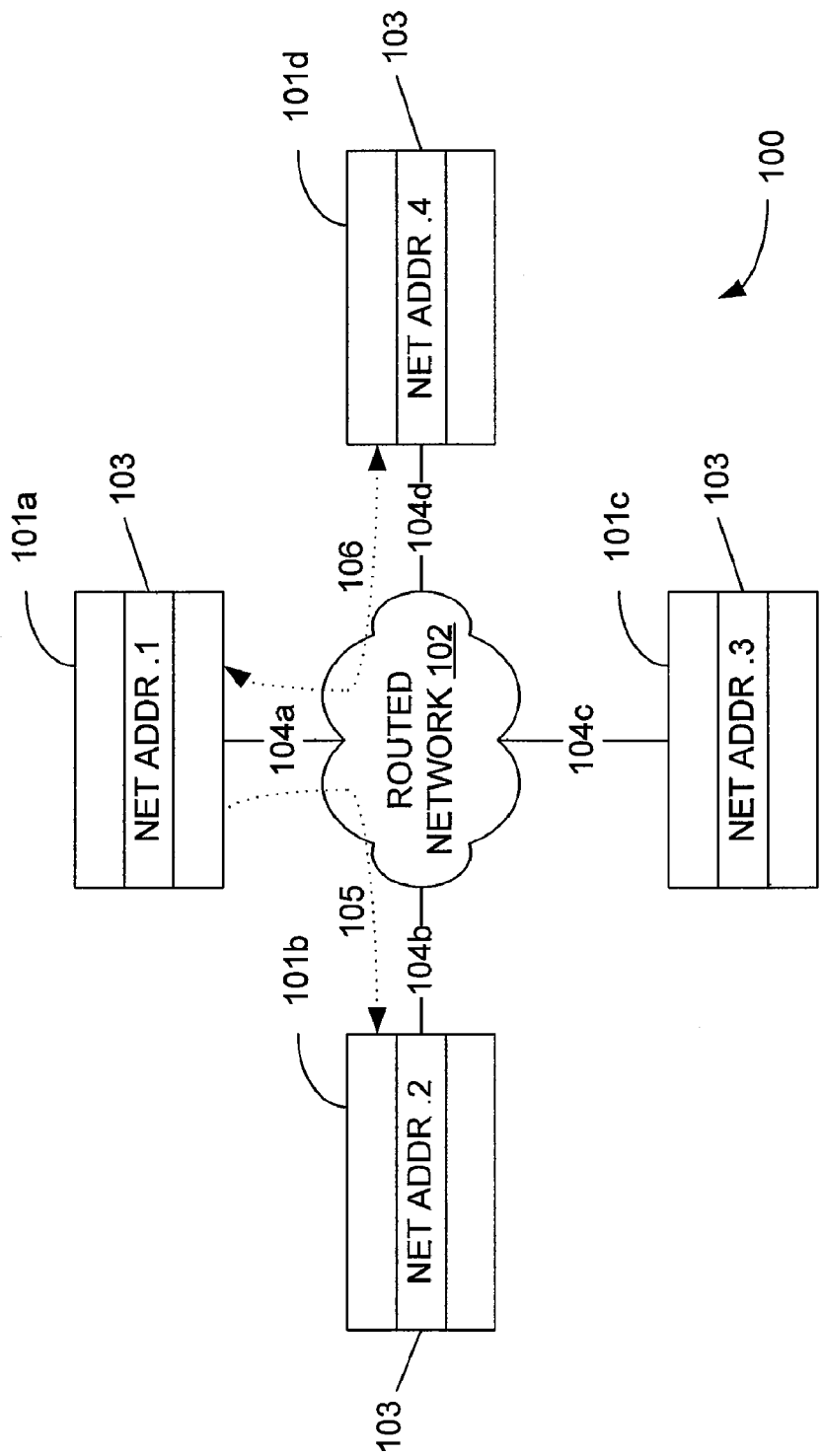
FIG. 1 is a block diagram of a communications environment where an embodiment of the system and/or method of the present invention operates.

Systems and methods for automatic discovery of network node addresses are provided. As will be described in more below, some embodiments of the systems and methods rely on the initial provisioning of a relatively small number of node addresses by the network administrator, combined with ability of the nodes to propagate this initial set of node addresses throughout the network using unicast addressing. The discovery by one node of another node's address, either automatically or through provisioning, results in the creation of a "path" between the two nodes. By varying the initial provisioning of node addresses, the network administrator can create a network configuration comprising of paths between all nodes (a "full mesh"), between tiers of nodes, or any other combination. Thus, applications executing on these nodes communicate with other nodes only through paths which are controllable by the network administrator.

The patent application with Ser. No. 10/603,038, entitled "Automatic Discovery of Network Core Type" and filed on Jun. 24, 2003, is incorporated by reference in its entirety herein. In addition, the patent application with International Application No. PCT/US03/19998, entitled "Determination of Network Performance Characteristics" and filed on Jun. 24, 2003 (National Stage Entry Serial No. 10/515,222 filed on Nov. 19, 2004), is incorporated by reference in its entirety herein.

The systems and/or methods can be implemented in software, hardware, or a combination thereof. In some embodiments, the system and/or method is implemented in software that is stored in a memory and that is executed by a suitable microprocessor (uP) situated in a communications device. However, system and/or method, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

FIG. 1 is a block diagram of a communications environment in which an embodiment of the system and/or method for automatic discovery of network nodes operates. The computer network 100 comprises one or more computer systems, known as network nodes 101a-d, in communication with each other through routed network 102.

Each node 101a-d has a network address 103a-d, and a link 104a-d to routed network 102. The systems and methods for automatic discovery of network nodes are applicable for nodes 101a-d of many different types, including but not limited to personal computers and workstations, computer peripherals such as printers and scanners, and network devices such as hubs, bridges, routers, and switches. Routed network 102 may be any network which provides layer 3 (network protocol layer) connectivity. Although the discussion herein makes reference to Internet Protocol (IP) as the network protocol, the systems and methods for automatic discovery of network nodes are not limited to IP, but is applicable to any network protocol that supports unicast network addresses. Many different types of links 104 can be used to connect each node 101 to routed network 102, including but not limited to analog telephone lines, DSL, Ethernet, and wireless. The systems and methods for automatic discovery of network nodes are not dependent on any particular type of link 104.

A node 101a is "reachable" by another node 101b if the combination of links 104a,b and routed network 102 provides a communication path between the two nodes. However, one node 101a can communicate with another reachable node 101b only if node 101a knows the network address 103b of the reachable node 101b. If node 101a does know the network address 103b of the reachable node 101b, then a "path" exists between node 101a and node 101b.

Paths may be unidirectional or bidirectional. If node 101a knows the network address 103b of node 101b but node 101b does not know the network address 103a of node 101a, then there is one unidirectional path from node 101a to node 101b. However, if node 101a knows the network address 103b of node 101b, and node 101b also knows the network address 103b of node 101b, then there is also a second unidirectional path, from node 101b to node 101a. These two unidirectional paths, taken together, may also be referred to as a single bidirectional path between node 101a and node 101 b.

In FIG. 1, one unidirectional path 105 and one bidirectional path 106 are shown. Unidirectional path 105 implies that node 101a can communicate with node bib. But because there is no unidirectional path from node 101b to node 101a, this also implies that node 101b cannot communicate with node 101a. In contrast, bidirectional path 106 implies that node 101a can communicate with node 101d and vice-versa.

Various mechanisms exist which allow one node to discover the network address of another node. A network administrator may provide node 101a with the network address of other reachable network nodes, for example through a configuration file, a command line interface, or a network management system such as SNMP. However, this mechanism is not feasible for today's networks which contain dozens or even hundreds of nodes.

A node may also advertise its own network address to other reachable nodes by transmitting on routed network 102 using a broadcast or multicast address. A broadcast address is a single well-known address which all network nodes are aware of and can listen on. A multicast address is one of a group of well-known addresses which all network nodes are aware of and can listen on. Therefore, a node listening on either the broadcast address or one of the multicast addresses can learn the address of the sender without knowing the sender's address ahead of time. However, for a large scale network with hundreds of nodes broadcasting, this mechanism places a heavy burden on the nodes which receive large numbers of broadcast packets.

Figure 2:
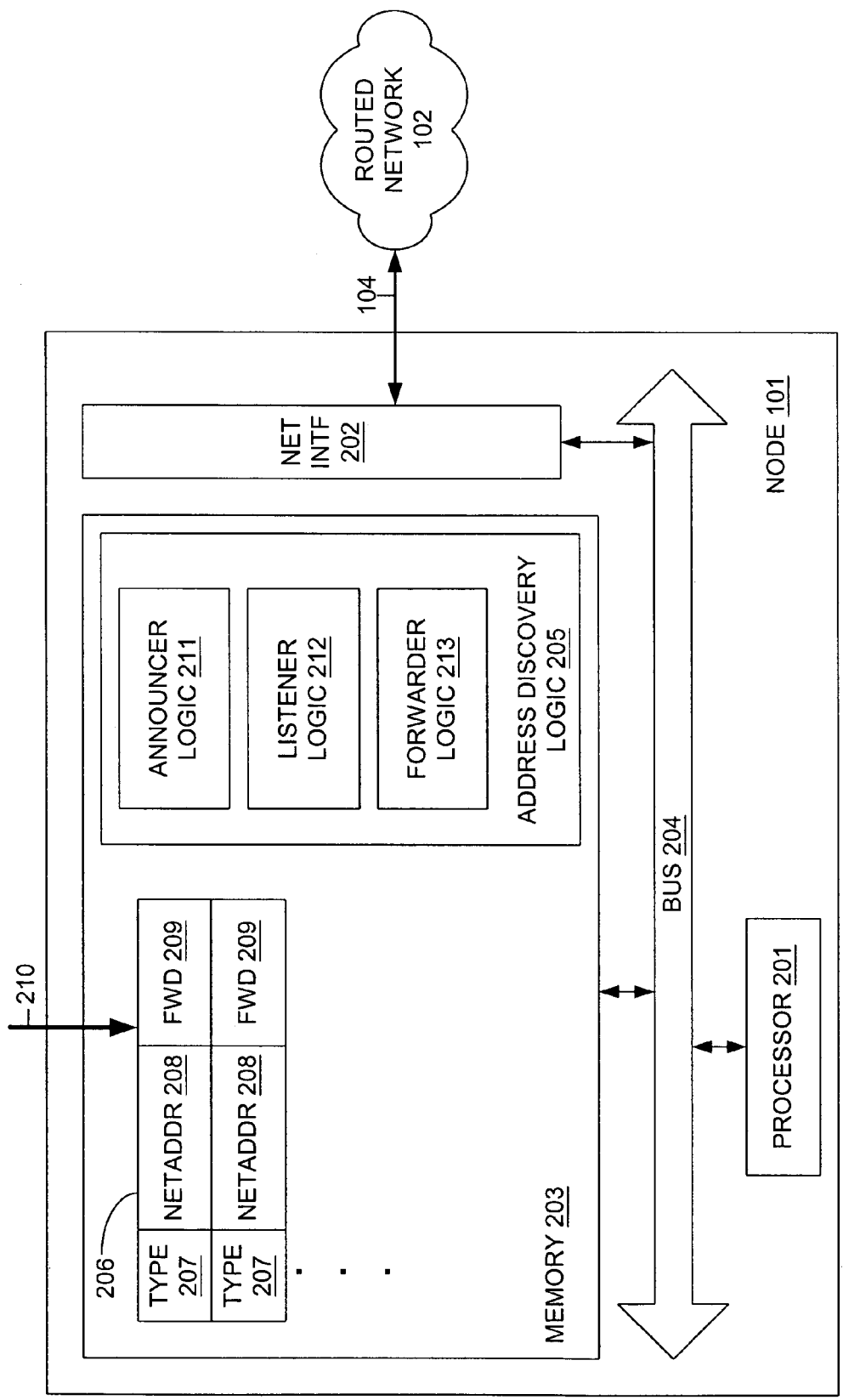
FIG. 2 is a block diagram of one embodiment of a node from FIG. 1 which utilizes an embodiment of a system and/or method for automatic discovery of network addresses.

FIG. 2 is a block diagram of one embodiment of a node 101 from FIG. 1 which utilizes the systems and/or methods for automatic discovery of network addresses. Node 101 contains a number of components that are well known in the art of data communications, including a processor 201, network interface 202, and memory 203. These components are coupled via bus 204. Omitted from FIG. 2 for simplicity are a number of conventional components that are not necessary to explain the operation of the system and/or method for automatic discovery of network addresses and known to those skilled in the art.

Network interface 202 provides communication with routed network 102 through link 104. Contained within memory 203 is address discovery logic 205. Address discovery logic 205 is configured to enable and drive processor 201 to allow the discovery of network addresses of nodes 101 on routed network 102. Memory 203 also contains a list of known nodes 206 containing the network address 103 of each node 101 in network 100 which this particular node 101 knows about.

In some embodiments, each entry in the list 206 of known nodes contains a type field 207, a network address field 208, and a forward count field 209. In this example, there are only four entries, but any number of entries could be supported. Type field 207 is "discovered" if the entry was added through automatic discovery (discussed later). Type field 207 is "static" if the entry was added through add/delete mechanism 210, which can take the form of, for example, a configuration file, a command line interface or a network management system.

The forward count field 209 controls how the network address field 208 of the node entry is forwarded to other nodes. If the forward count field 209 is zero, then the address is not forwarded to other nodes. If the forward count field 209 is non-zero, then the address is forwarded to other nodes for the number of hops in the forward count field 209. Use of the forward count field 209 is explained in detail later.

The list of known nodes 206 is accessed by announcer logic 211, listener logic 212 and forwarder logic 213. Announcer logic 211 makes announcements to other nodes 101a-d about the network address 103 of those nodes it knows about, that is, the nodes in the list of known nodes 206. More specifically, announcer logic 211 makes announcements to listener logic 212 in other nodes 101. That is, listener logic 212 is listening for announcements from other announcers 211, where the announcements contain network addresses 103. On receipt of an announcement, listener logic 212 adds the network address 103 contained in the announcement to its own list of known nodes 206. Forwarder logic 213 may forward the announcement (received from another node 101) to all the nodes in its own list of known nodes 206, depending on the contents of the forward count field 209.

In other embodiments, two lists are used rather than one. One list contains only Discovered nodes added through automatic discovery. The other list contains only Static nodes added through add/delete mechanism 210. While the following descriptions will refer only to a single-list embodiment, one skilled in the art will recognize how the single list of known nodes 206 containing both Static and Discovered nodes of the first described embodiment could be adapted to work with another embodiment using two separate Static and Discovered lists.

Figure 3A:
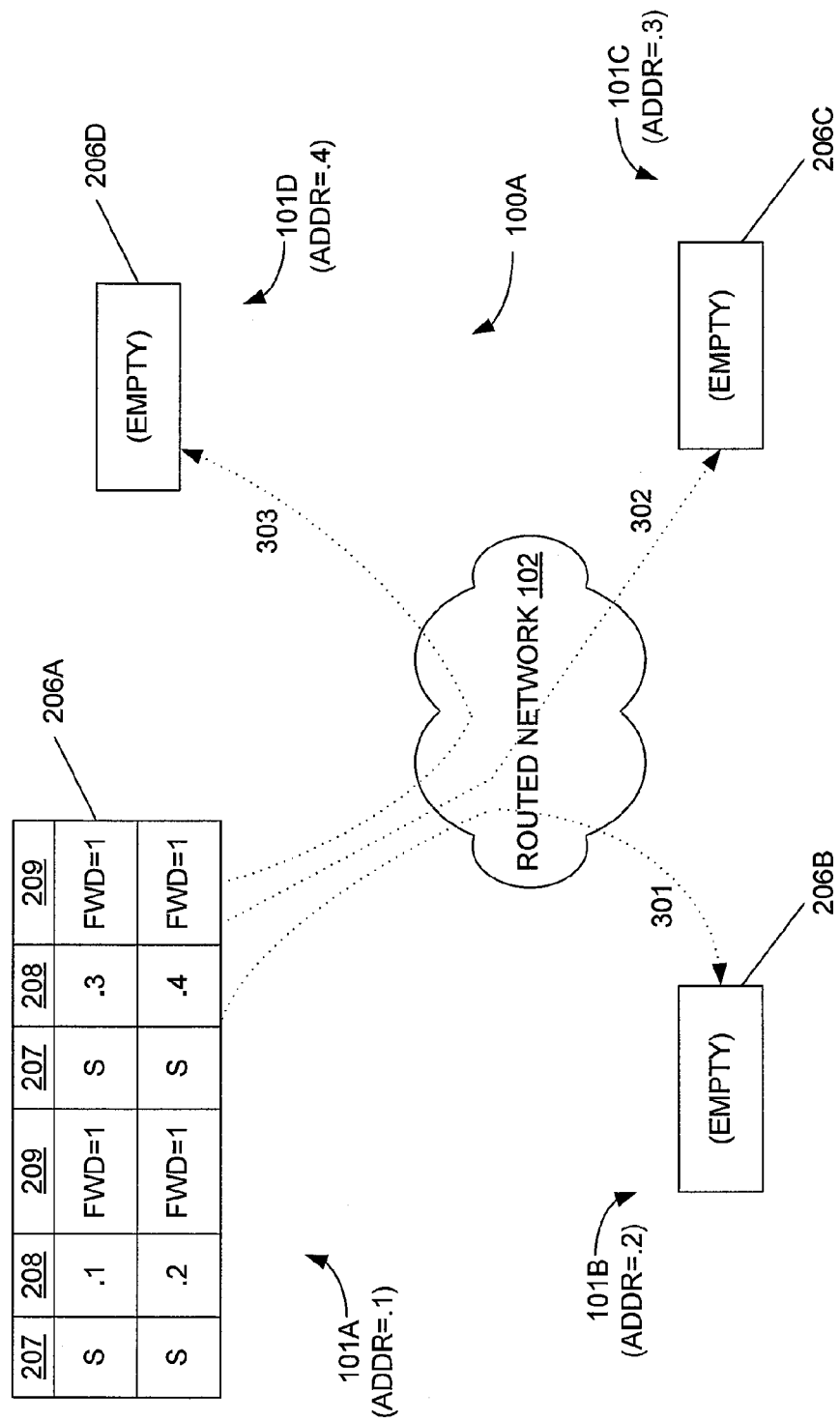
FIGS. 3A-C are a sequence of diagrams showing how the list of known nodes in each node is updated by announcements and forwarding in one example network configuration.
Figure 3B:
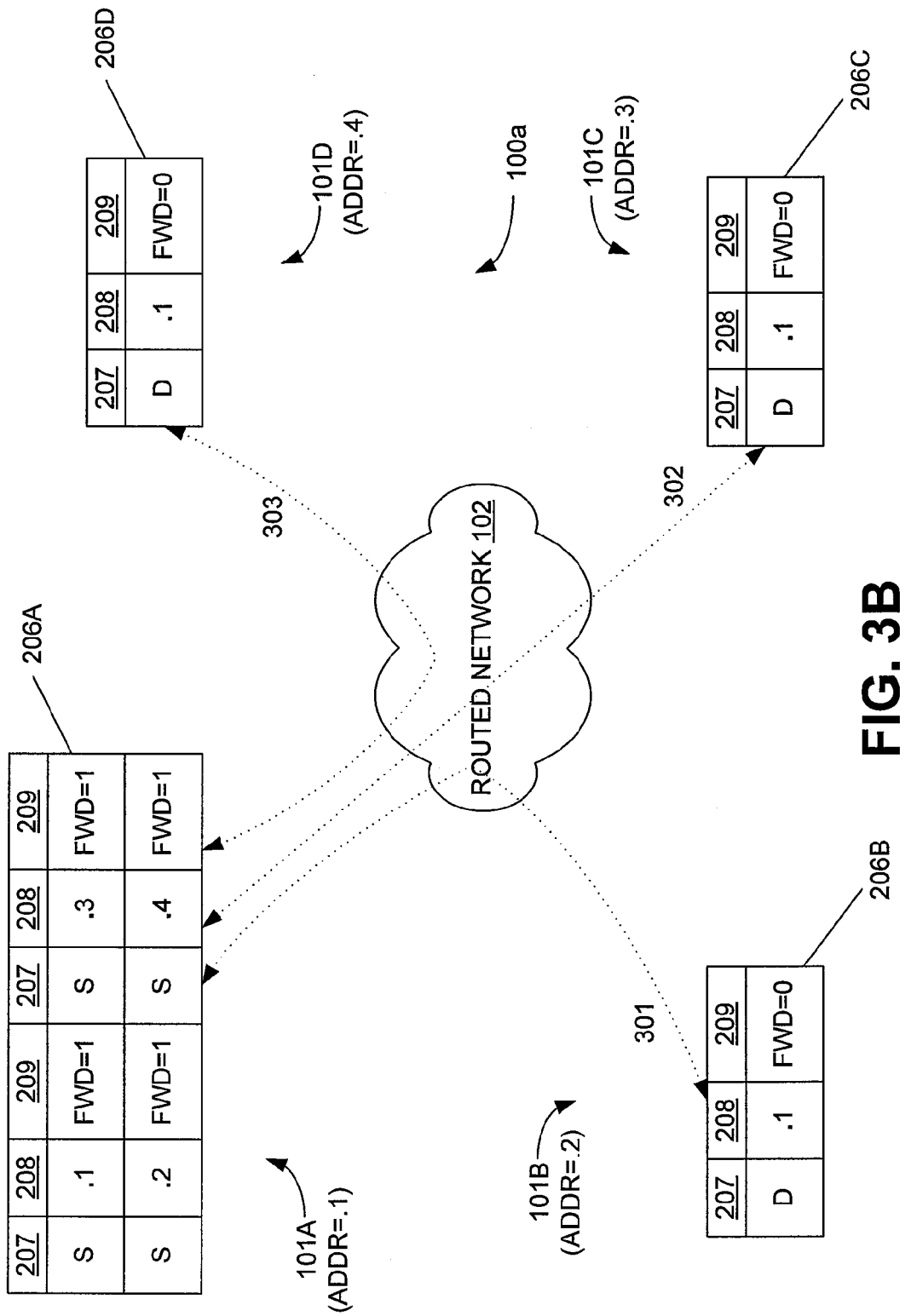
Figure 3C:
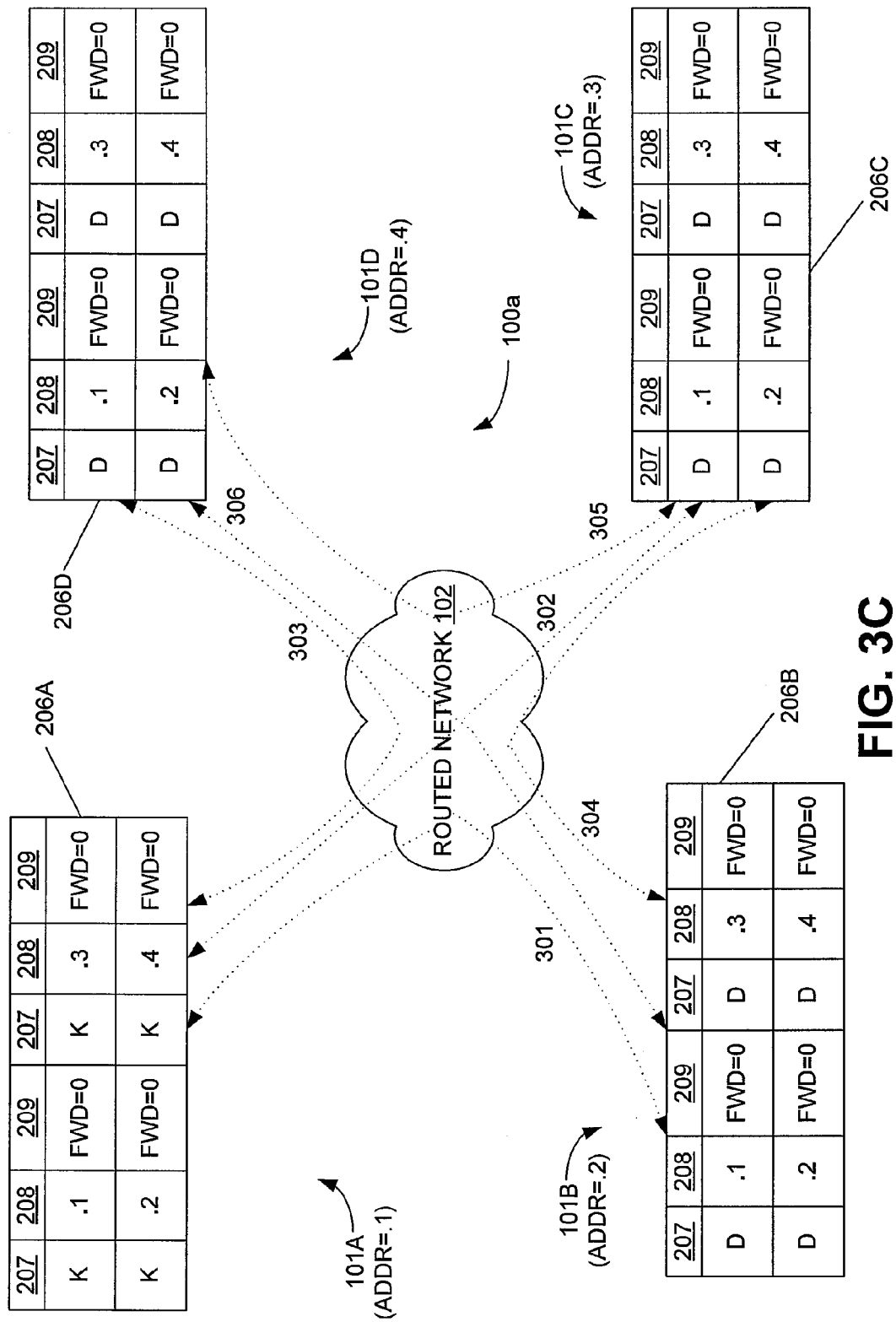

The workings of the systems and methods for automatic discovery of network addresses are explained by FIGS. 3A-C, which are a sequence of diagrams showing how the list of known nodes 206 in each node 101 a-d is updated by announcements and forwarding. In explaining FIGS. 3A-C, reference will also be made to FIGS. 4 and 5, which are flowcharts of an embodiment of a method for automatic discovery of network addresses.

In FIG. 3A, a network with configuration 100a has four nodes 101a-d connected to routed network 102. For simplicity, links 104a-d connecting the nodes to routed network 102 are not shown. Each node 101 is reachable by all of the other nodes through routed network 102. In this example, nodes 101a-d have network addresses .1, .2, .3 and .4, respectively. This minimal network address format is used for illustration only; actual network layer protocols such as IP use a more complicated format.

Figure 4:
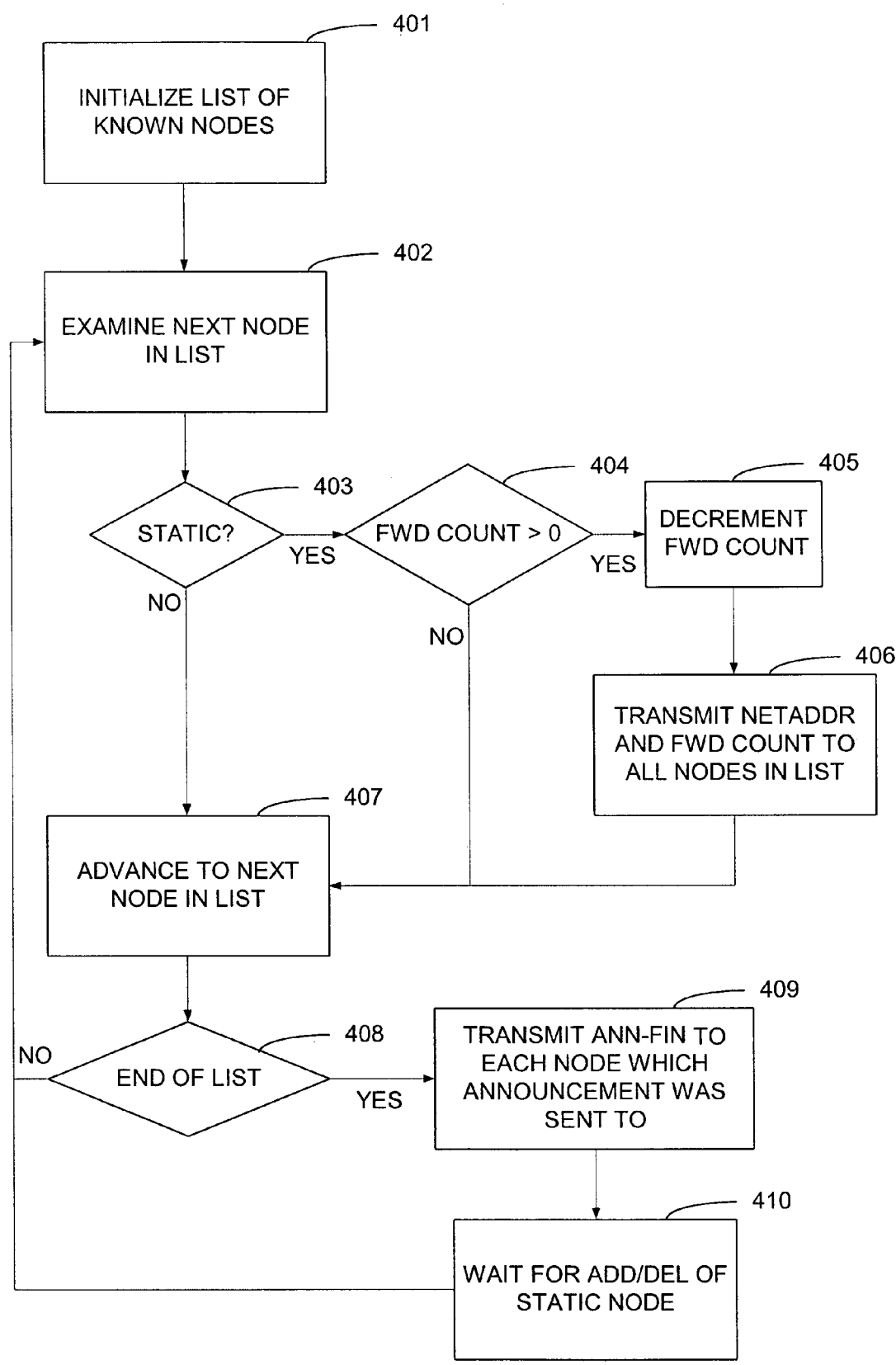
FIG. 4 is a flowchart of an embodiment of method for automatic discovery of network addresses.

The process of automatic discovery begins with step 401 in the flowchart of FIG. 4, where a node 101 initializes its list of known nodes 206. (These initial values are provided by the network administrator, through add/delete mechanism 210.) FIG. 3A shows a snapshot of each node's list of known nodes 206 after the initialization step 401 has been performed by each of the nodes 101a-d. The list of known nodes 206a for node 101a contains four entries, one for itself and one for each of the three remaining nodes. Each entry has type field 207 set to Static, meaning that the entries were not discovered by announcements received or forwarding by other nodes. Each entry has forward count field 209 set to nonzero, meaning that the entries will be forwarded to other nodes. The list of known nodes 206b-d for nodes 101 b-d is empty.

FIG. 3A also shows any paths which exist between nodes 101a-d at this initial time, as implied by the contents of the lists 206a-d. The entries in the list of known nodes 206a imply that a unidirectional path exists from node 101a to each of the other nodes 101b-d, as shown by dotted lines 301, 302, 303. There are no paths shown leading out of nodes 101b-d because the corresponding list for each of those nodes, 206b-d, is empty.

The process of automatic discovery continues with step 402 in the flowchart of FIG. 4, where the current node in list 206 is examined. At step 403, if the type is Discovered then the next node is processed by continuing at step 407. If the type is Static, however, the current node is processed by continuing to step 404.

At step 404, the forward count field 209 of the current node is compared to zero, and if the forward count field 209 is equal to zero, then the next node is processed by continuing at step 407. If the forward count field 209 is non-zero, the forward count field 209 is decremented at step 405. Next, at step 406, the network address field 208 and the (decremented) forward count field 209 of this current node is transmitted to all those nodes 101 a-d in list 206 which have type Static. This transmission of a network address and a forward count from one node to another, based on a Static type node, is called an "announcement."

Step 407 advances to the next node in the list 206, then step 408 determines if the newly advanced current node entry has reached the end of the list of known nodes 206. If the end of the list has not been reached, then processing continues back at step 402, where the newly advanced current node entry is examined. If the end of the list has been reached, step 409 informs each node to which an announcement was sent that announcements are finished. One skilled in the art should realize that the details of this step may be varied, depending on the implementation. For example, instead of waiting for all announcements to all nodes to be finished before sending an "announcement finished" to all nodes, it may be desirable to send an "announcement finished" to node X on completion of all announcements to node X, without waiting until all announcements to other nodes are complete.

Processing of announcing continues at step 410, which waits for addition or deletion of a Static node by the network administrator. When a Static node is added or deleted, processing of the list begins again at step 402.

Figure 5:
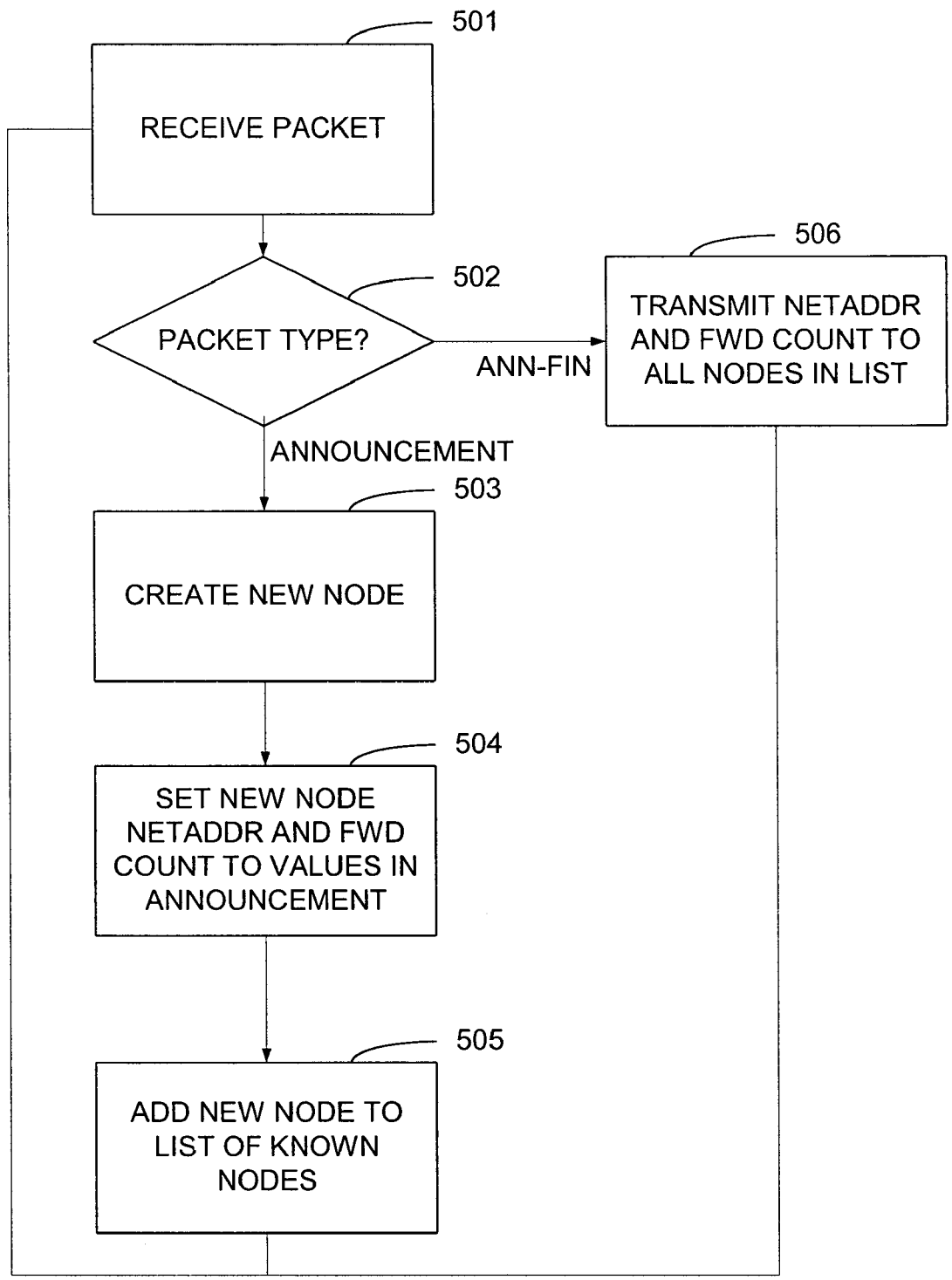
FIG. 5 is a flowchart of another embodiment of method for automatic discovery of network addresses.

FIG. 5 is a flow chart showing how announcements made by one node 101 are received and processed by another node 101. Step 501 waits for an announcement to be received. Step 502 determines whether the packet is an announcement or an announcement-finished. If the packet type is announcement, processing continues at step 503, where a new entry for list of known nodes 206 is created. The new entry's network address field 208 and forward count field 209 are initialized at step 504 from the values in the announcement packet, and the new entry's type field 207 is set to Discovered. At step 505 the newly created node is added to list of known nodes 206.

One skilled in the art should realize that no new information is imparted when an announcement is received by a node and the announcement contains the node's own network address. Therefore, the announcement can be ignored, or the announcer could avoid sending this packet by comparing the destination network address of the packet to the network address field 208.

If step 502 determined that the received packet was an announcement-finished, then processing continues at step 506, where new node(s) are transmitted to all nodes 101a-d in list 206. Processing then continues again at step 501 where another announcement is waited on.

This transmission of a network address and a forward count from one node to another, based on a Discovered node, is called a "forward." Forwarding differs from announcing in several ways. Announcing notifies other nodes about Static nodes but not about Discovered nodes, while forwarding notifies other nodes about both Static and Discovered nodes. Forwarding happens in response to receiving an announcement packet. Announcing happens at initialization, and in response to a new Static node being added/deleted by the add/delete mechanism 210.

FIG. 3B follows FIG 3A in time. FIG. 3B shows the result of the first iteration of steps 402-407 and the first iteration of steps 501-506 for the example network.

Making announcements to specific nodes using unicast destination network addresses is preferable to making an announcement to all nodes using the broadcast destination network address, because all nodes on the network, even those not interested in participating in Discovered discovery, receive broadcast packets. The broadcasting technique is used by other protocols (such as routing protocols), so that network nodes already have to process broadcast traffic. The system and method of the present invention does not require each node to process increased broadcast traffic. Using unicast destination network addresses is also preferable to using a multicast address. Multicast packets are not received by all nodes, only those listening to the particular multicast address, but multicast is not widely supported by network layer protocols. The use of unicast addresses is especially desirable for carrying network management traffic which is in-band.

As shown in FIG. 3B, the lists 206b-d for the other nodes are updated with the announced address of .1, so that the lists 206b-d which were empty in FIG. 3A now contain one entry each. This single entry has a network address field 208 of .1, a forward count field 209 of zero (decremented from its original value in list 206a), and a type field 207 of Discovered, since the network address was discovered by announcement. The forwarders 213 in nodes 101 b-d do not forward the announcement packets after receipt by listener logic 212 in the same node, since the forward count field 209 of the received packets are zero.

As a result of the updated lists 206b-d, by which nodes 101b-d learned the network address of node 101a, a path now exists from each of nodes 101b-d to 101a. FIG. 3B thus shows paths 301, 302, 303 as bidirectional, where in FIG. 3A these same paths were unidirectional.

The above description, using one network address per announcement, results in 16 announcement packets for the example network configuration. One skilled in the art should recognize that an announcement packet destined for a particular node can contain as data the network address of more than one node. In other embodiments, a single announcement packet containing the network address and forward count of each node in the list of known nodes 206 could be transmitted to each of the four nodes in the list. In the example network configuration, this results in four announcement packets rather than 16. One skilled in the art should recognize that many packet sizes and thus many numbers of network addresses in each packet are possible.

FIG. 3C follows FIG. 3B in time, and shows the result of all iterations of steps 402-407 and all iterations of steps 501-506 for the example network configuration.

Lists 206b-d differ from list 206a. The entries in list 206a are of type Static, while the entries in lists 206b-d are of type Discovered. Also, the entries in lists 206b-d have Forward Counts of zero, since the original Forward Count of 1 in list 206a was decremented before transmitting to the other nodes in the announcement. However, the Forward Count in the sender's list 206 is not decremented.

This arrangement is called a "full mesh." FIG. 3C thus shows the same three bidirectional paths 301, 302, 303 from FIG. 3B, plus three additional bidirectional paths 304, 305, and 306.

The workings of one embodiment of a system and method for automatic discovery of network addresses are further explained by FIGS. 6A-D, which are a sequence of diagrams showing the announcements and forwarding for a different network configuration 100b. As with FIGS. 3A-C, FIGS. 6A-D show how the list of known nodes 206 in each node 101a-d is updated by announcements and forwarding.

Network configuration 100a contained one list, 206a, which contained the node addresses of all other nodes.

The list of known nodes 206a for node 101a contains two entries, one for node 101b and one for node 101c.

The list of known nodes 206b for node 101b contains two entries, one for node 101d and one for node 101e. Both entries have the forward count field 209 set to 1 and the type field 207 set to Static. This set of entries for list 206b implies the existence of unidirectional paths 603 and 604.

The list of known nodes 206c for node 101c contains two entries, one for node 101f and one for node 101g. Both entries have the forward count field 209 set to 1 and the type field 207 set to Static. This set of entries for list 206c implies the existence of unidirectional paths 605 and 606.

Figure 6A:
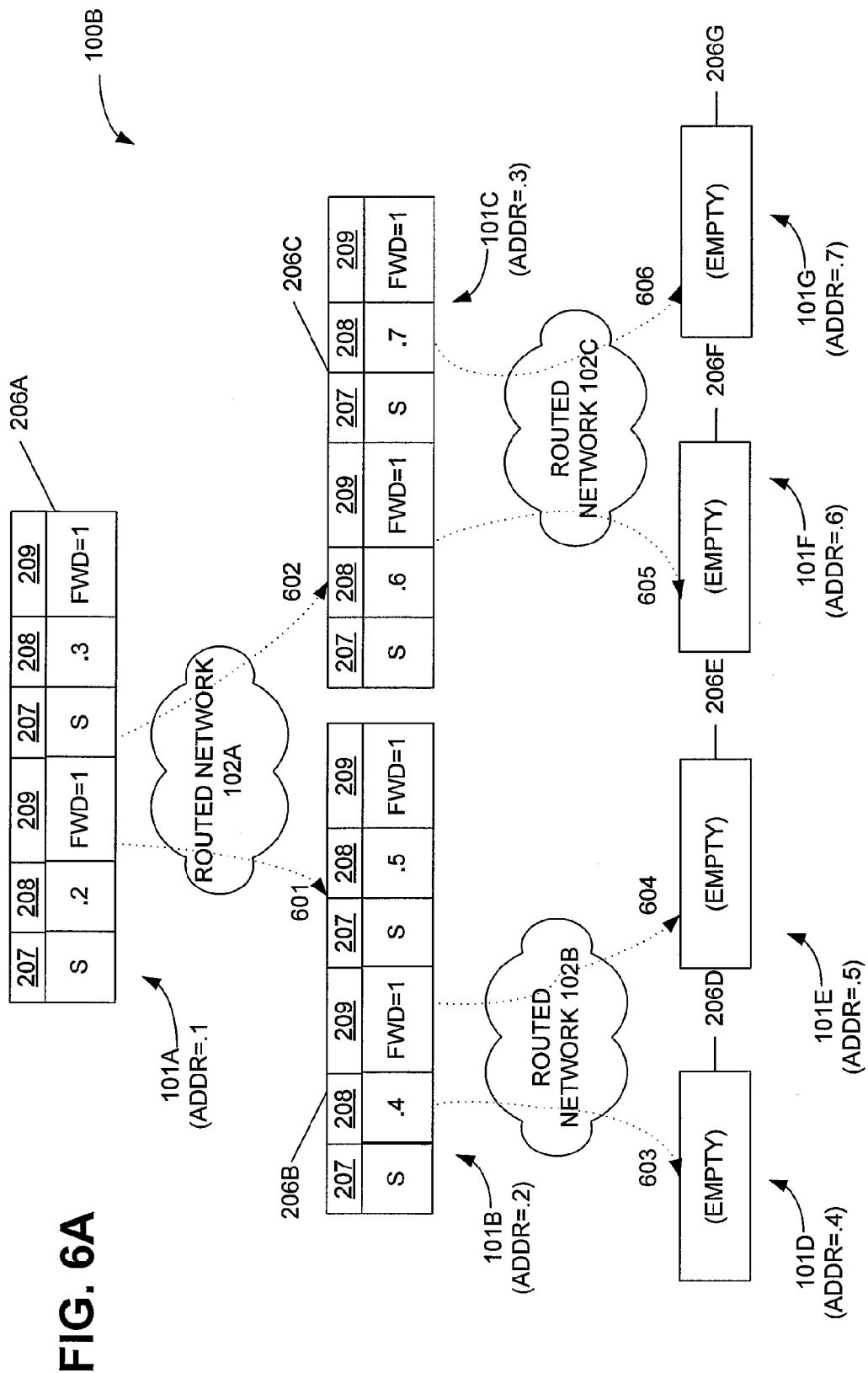
FIGS. 6A-D are a sequence of diagrams showing how the list of known nodes in each node is updated by announcements and forwarding in another example network configuration.
Figure 6B:
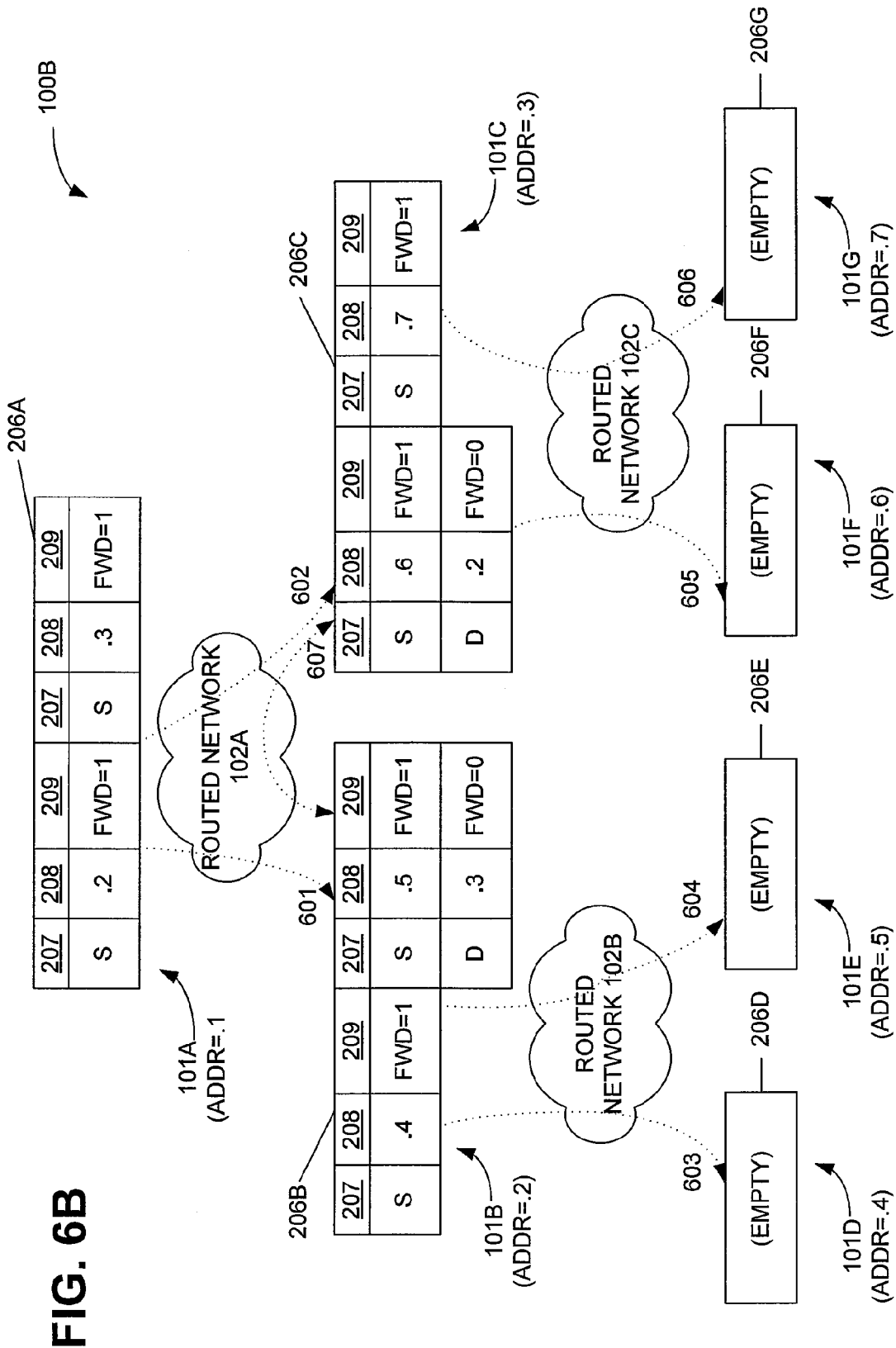

FIG. 6B shows a snapshot of each node's list of known nodes 206 after node 101a has announced the Static nodes in its list 206a. There are two Static nodes in list 206a, and both have a non-zero Forwarding Count. Therefore, node 101a announces address .2 to both Static nodes in its list 206a (.2 and .3), and also announces address .3 to both Static nodes.

The list 206b in node 101b remains unchanged by the announcement of node .2, since the announcement contained only the node's own address. However, the list 206c in node 101c has been updated with a new Discovered node with the network address field 208 set to .2, and with forward count field 209 set to zero. Because forward count field 209 is zero (node 101a decremented the count before transmitting the announcement), node 101c does not forward the new node address (.2) on to other nodes.

The list 206c in node 101c remains unchanged by the announcement of node .3, since the announcement contained only the node's own address. However, the list 206b in node 101b has been updated with a new Discovered node with the network address field 208 set to .3, and with forward count field 209 set to zero. Because forward count field 209 is zero (node 101a decremented the count before transmitting the announcement), node 101b does not forward the new node address (.3) on to other nodes. The two new Discovered nodes in list 206b and list 206c implies the existence of two unidirectional paths, which is equivalent to bidirectional path 607 as shown.

Figure 6C:
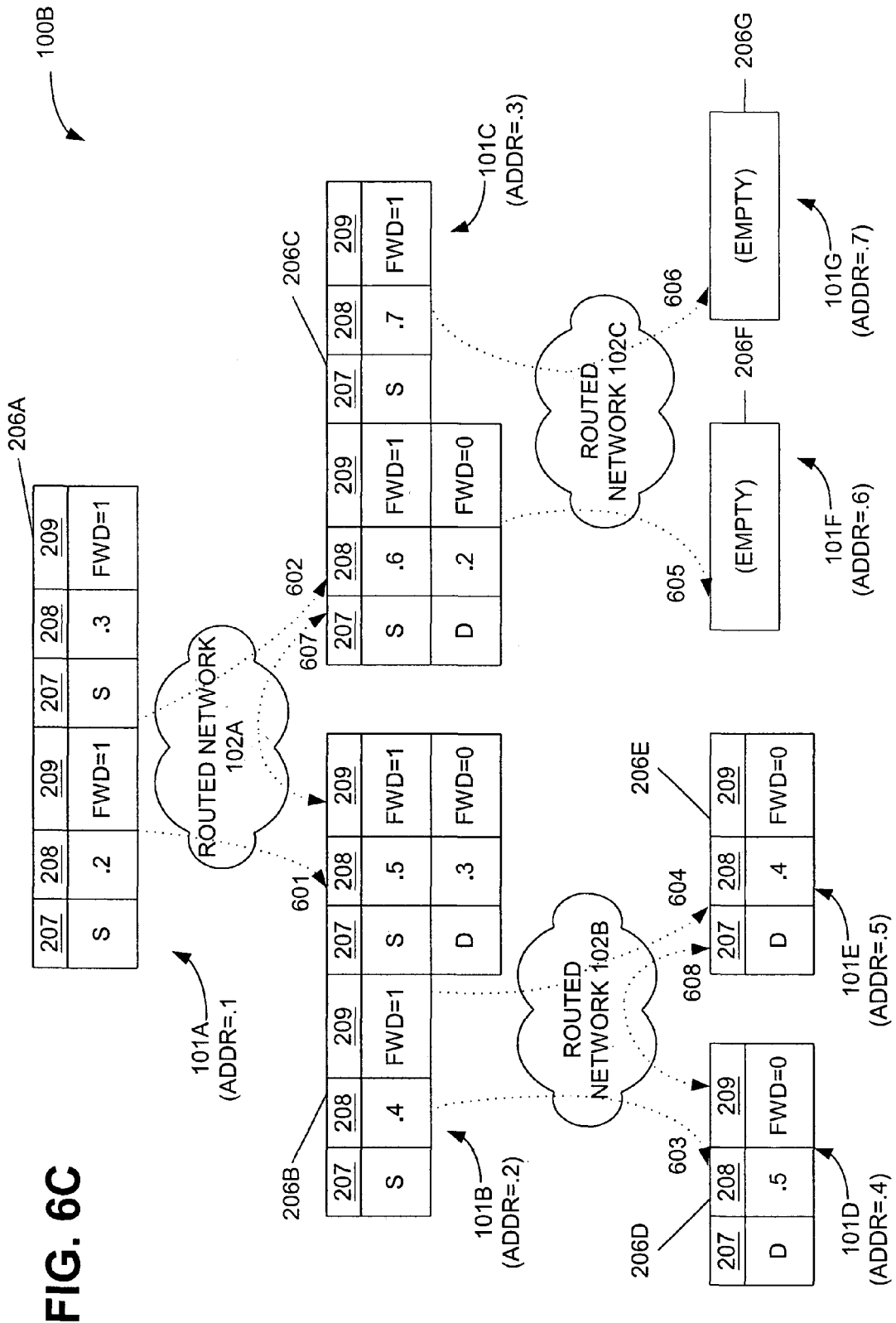

FIG. 6C shows a snapshot of each node's list of known nodes 206 after node 101b has announced the Static nodes in its list 206b. There are two Static nodes in list 206b, and both have a non-zero Forwarding Count. Therefore, node 101b announces address .4 to both Static nodes in its list 206b (.4 and .5), and also announces address .5 to both Static nodes.

Because forward count field 209 is zero (node 101b decremented the count before transmitting the announcement), node 101e does not forward the new node address (.5) on to other nodes.

Because forward count field 209 is zero (node 101b decremented the count before transmitting the announcement), node 101d does not forward the new node address (.5) on to other nodes.

Figure 6D:
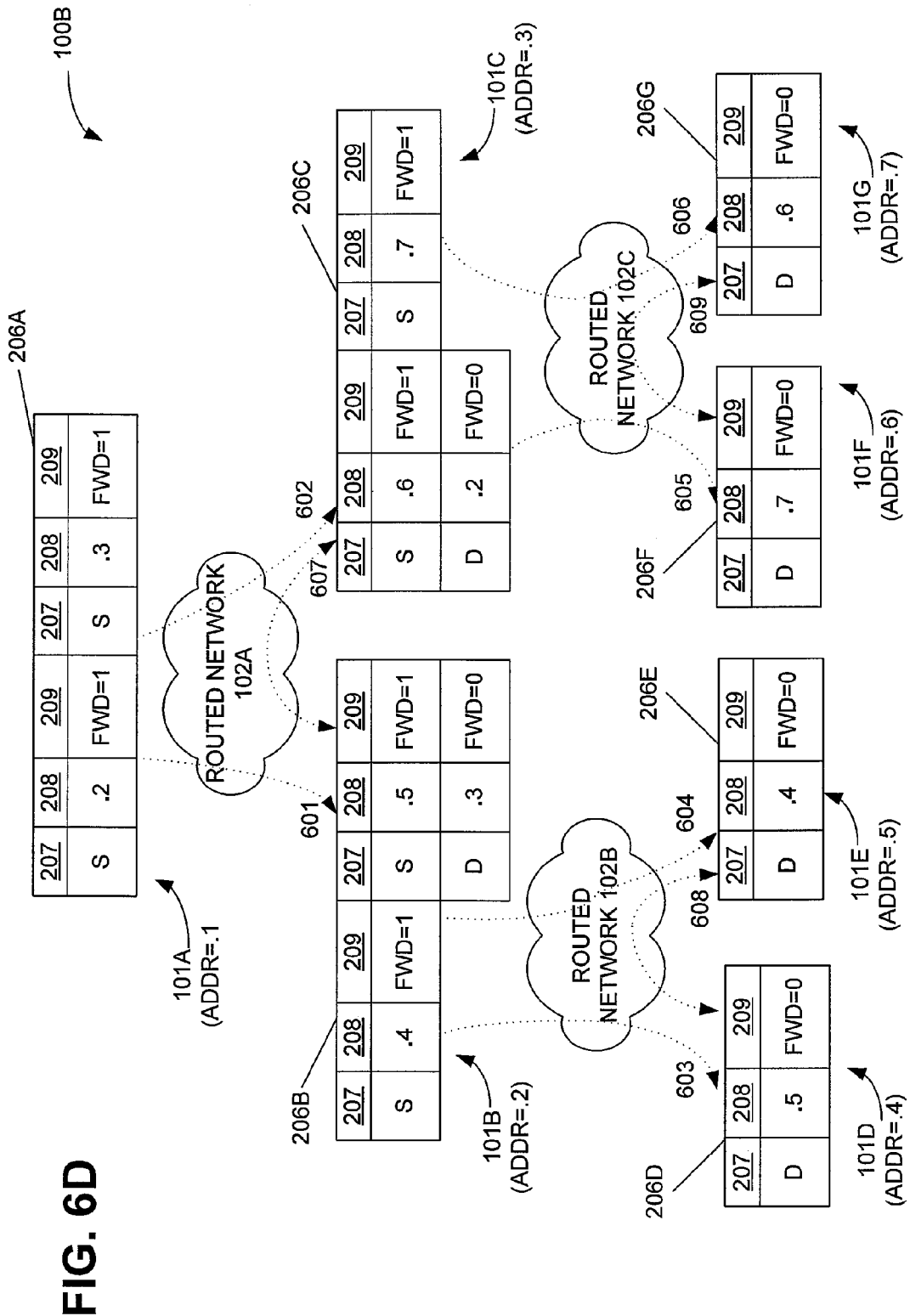

FIG. 6D shows a snapshot of each node's list of known nodes 206 after node 101c has announced the Static nodes in its list 206c. There are two Static nodes in list 206c, and both have a non-zero Forwarding Count. Therefore, node 101c announces address .6 to both Static nodes in its list 206c (.6 and .7), and also announces address .7 to both Static nodes.

The list 206f in node 101f remains unchanged by the announcement of node .6, since the announcement contained only the node's own address. However, the list 206g in node 101g has been updated with a new Discovered node with the network address field 208 set to .6, and with forward count field 209 set to zero. Because forward count field 209 is zero (node 101c decremented the count before transmitting the announcement), node 101g does not forward the new node address (.6) on to other nodes.

Because forward count field 209 is zero (node 101c decremented the count before transmitting the announcement), node 101f does not forward the new node address (.7) on to other nodes.

The paths resulting from the sequence described by FIGS. 6A-D are called "dual tier." FIG. 6D thus shows additional bidirectional paths 607, 608, and 609.

The workings of an embodiment of a system and method for automatic discovery of network addresses are further explained by FIGS. 7A-D, which are a sequence of diagrams showing the announcements and forwarding for a different network configuration 100c. As before, FIGS. 7A-D show how the list of known nodes 206 in each node 101a-g is updated by announcements and forwarding.

The network configuration 100 c (FIGS. 7A-D) is similar to network configuration 100b (6A-D), with seven nodes in three levels. But there are noticeable differences in the lists 206: the lists 206 in network configuration 100c contain some Static nodes with Forward Counts set to 2. This difference results in a different set of paths being created during the automatic discovery process, as will be shown in FIG. 7D.

The list of known nodes 206a for node 101a contains two entries, one for node 101b and one for node 101c.

The list of known nodes 206b for node 101b contains two entries, one for node 101d and one for node 101e. Both entries have the type field 207 set to Static. One entry has the forward count field 209 set to 2 and the other has the forward count field 209 set to 1. This set of entries for list 206b implies the existence of unidirectional paths 603 and 604.

The list of known nodes 206c for node 101c contains two entries, one for node 101f and one for node 101g. Both entries have the type field 207 set to Static. One entry has the forward count field 209 set to 2 and the other has the forward count field 209 set to 1. This set of entries for list 206c implies the existence of unidirectional paths 605 and 606.

Figure 7A:
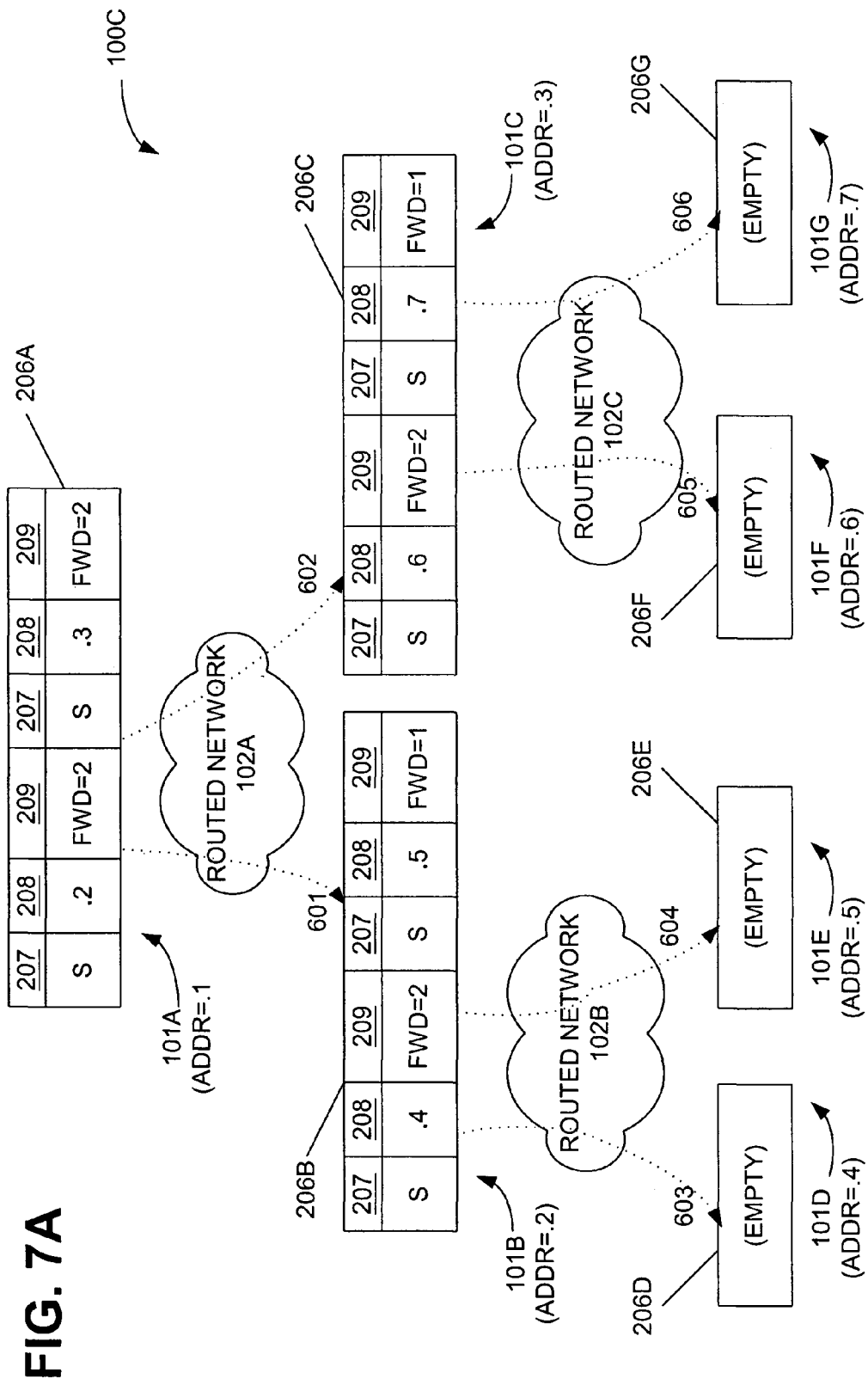
FIGS. 7A-D are a sequence of diagrams showing how the list of known nodes in each node is updated by announcements and forwarding in yet another example network configuration.
Figure 7B:
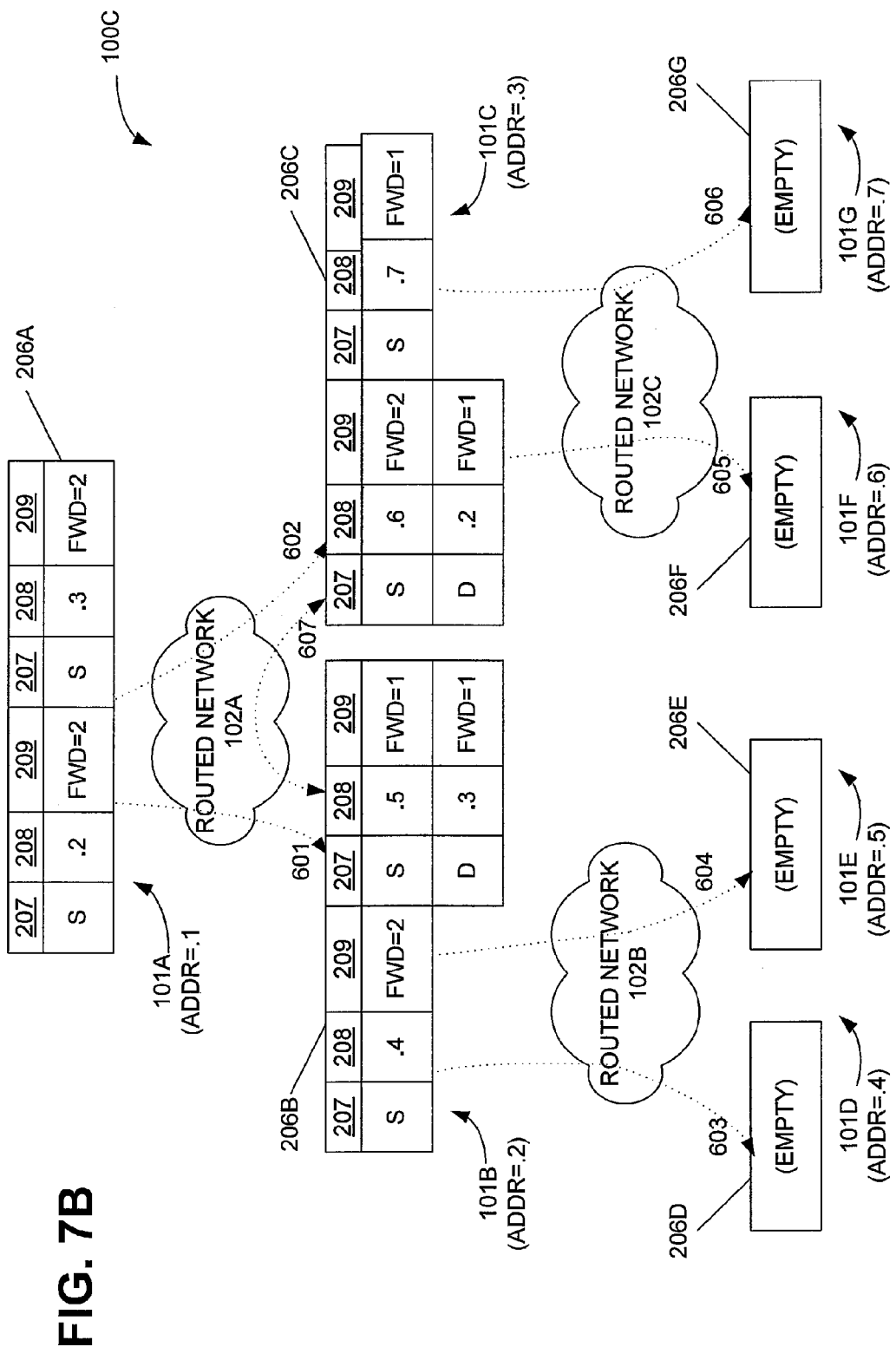

FIG. 7B shows a snapshot of each node's list of known nodes 206 after node 101a has announced the Static nodes in its list 206a. There are two Static nodes in list 206a, and both have a non-zero Forwarding Count. Therefore, node 101a announces address .2 to both Static nodes in its list 206a (.2 and .3), and also announces address .3 to both Static nodes.

The list 206b in node 101b remains unchanged by the announcement of node .2, since the announcement contained only the node's own address. However, the list 206c in node 101c has been updated with a new Discovered node with the network address field 208 set to .2, and with forward count field 209 set to 1. (Forwarding of this new non-zero Forward Count node will be described later, with reference to FIG. 7D.)

The list 206c in node 101 c remains unchanged by the announcement of node .3, since the announcement contained only the node's own address. However, the list 206b in node 101b has been updated with a new Discovered node with the network address field 208 set to .3, and with forward count field 209 set to 1. The two new Discovered nodes in list 206b and list 206c implies the existence of two unidirectional paths, which is equivalent to bidirectional path 607 as shown.

Figure 7C:
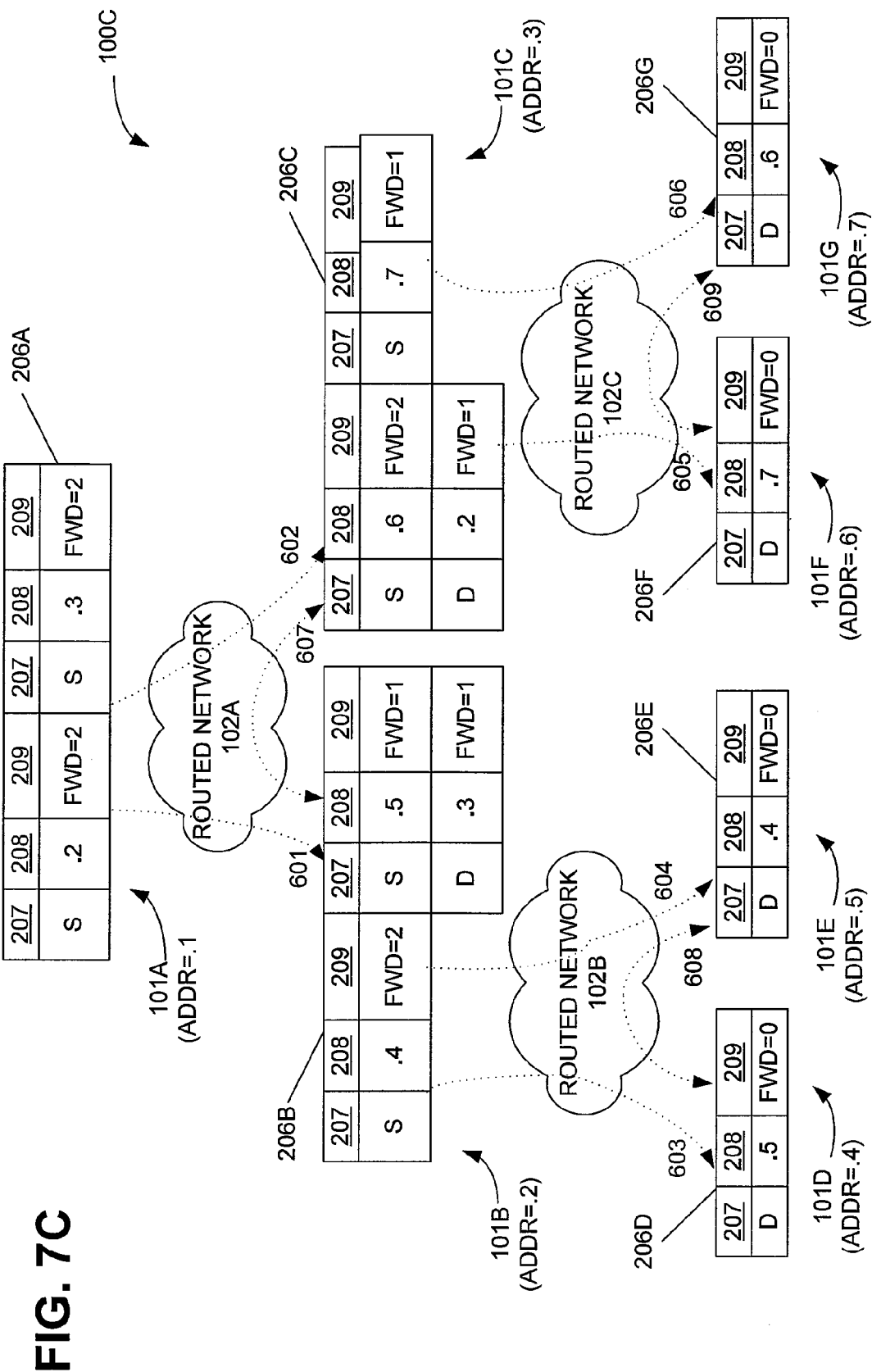

FIG. 7C shows a snapshot of each node's list of known nodes 206 after node 101b and node 101c have both announced the Static nodes in their lists 206b. There are two Static nodes in each of the lists 206b and 206c, and both have a non-zero Forwarding Count. Therefore, node 101b announces address .4 to both Static nodes in its list 206b (.4 and .5), and also announces address .5 to both Static nodes. Similarly, node 101c announces address .6 to both Static nodes in its list 206c (.6 and .7), and also announces address .7 to both Static nodes.

The result of the announcement of addresses .4 and .5 by node 101b is as follows.

The list 206e in node 101e is updated with a new Discovered node with the network address field 208 set to .4, and with forward count field 209 set to zero. The list 206d in node 101d is updated with a new Discovered node with the network address field 208 set to .5, and with forward count field 209 set to zero. Because the forward count fields on these new nodes are zero (decremented from 1 before transmitting the announcement), node 101d and node 101e do not forward the new node addresses (.4 and .5) on to other nodes. The two new Discovered nodes in list 206d and list 206e implies the existence of two unidirectional paths, which is equivalent to bidirectional path 608 as shown.

Similarly, the result of the announcement of addresses .6 and .7 by node 101c is as follows. The list 206g in node 101g is updated with a new Discovered node with the network address field 208 set to .6, and with forward count field 209 set to zero. The list 206f in node 101f is updated with a new Discovered node with the network address field 208 set to .7, and with forward count field 209 set to zero. Because the forward count fields on these new nodes are zero (decremented from 1 before transmitting the announcement), node 101f and node 101g do not forward the new node addresses (.6 and .7) on to other nodes. The two new Discovered nodes in list 206f and list 206g implies the existence of two unidirectional paths, which is equivalent to bidirectional path 609 as shown.

Figure 7D:
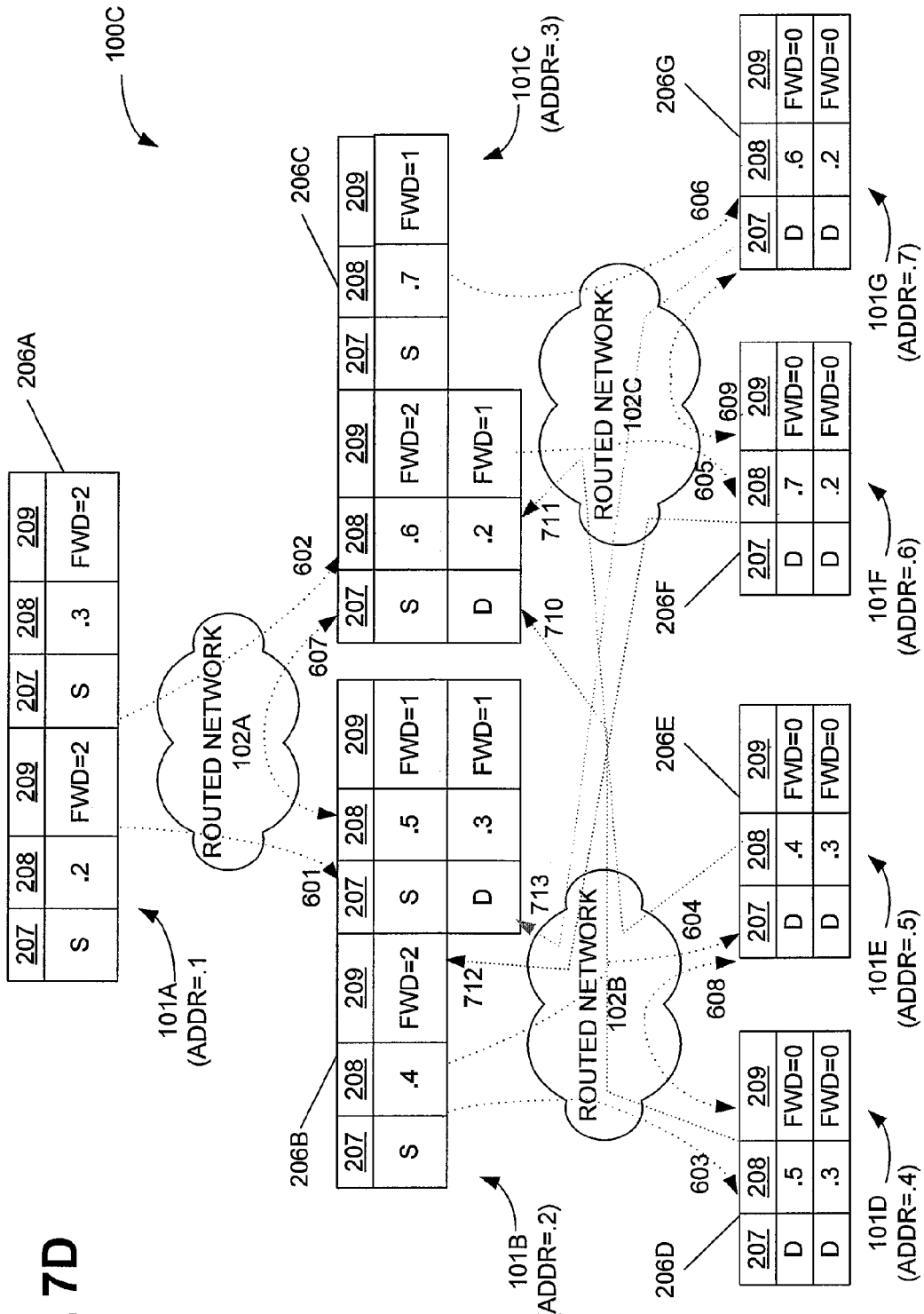

FIG. 7D shows a snapshot of each node's list of known nodes 206 after node 101b and node 101c have forwarded the Discovered nodes in their lists 206b and 206c. Node 101b announces address .3 to all other nodes in its list 206b, which is nodes .4 and .5. Node 101c announces address .2 to all other nodes in its list 206c, which is nodes .6 and .7.

The result of the forwarding of address .3 by node 101b is as follows. The list 206d in node 101d is updated with a new Discovered node with the network address field 208 set to .3, and with forward count field 209 set to zero. The new Discovered node in list 206d implies the existence of a unidirectional path 710 from node 101d to node 101c. The list 206e in node 101e is updated with a new Discovered node with the network address field 208 set to .3, and with forward count field 209 set to zero. The new Discovered node in list 206e implies the existence of a unidirectional path 711 from node 101e to node 101c.

The list 206f in node 101d is updated with a new Discovered node with the network address field 208 set to .3, and with forward count field 209 set to zero.

Some Discovered nodes in FIG. 7D have a forward count field 209 of 1.

The set of paths created by network configuration 100c, as shown in FIG. 7D, is different than the set of paths created by network configuration 100b, as shown in FIG. 6D. In FIG. 7D, each node in the lowest level is connected to both nodes in the second level, by paths 603, 604, 710, 711 and 605, 606, 712, 713. In contrast, in FIG. 6D, each node in the lowest level is connected to only one node in the second level, by paths 603, 604 and 605, 606. There is no equivalent to paths 710, 711, 712 and 713 in FIG. 6D.

Figure 8:
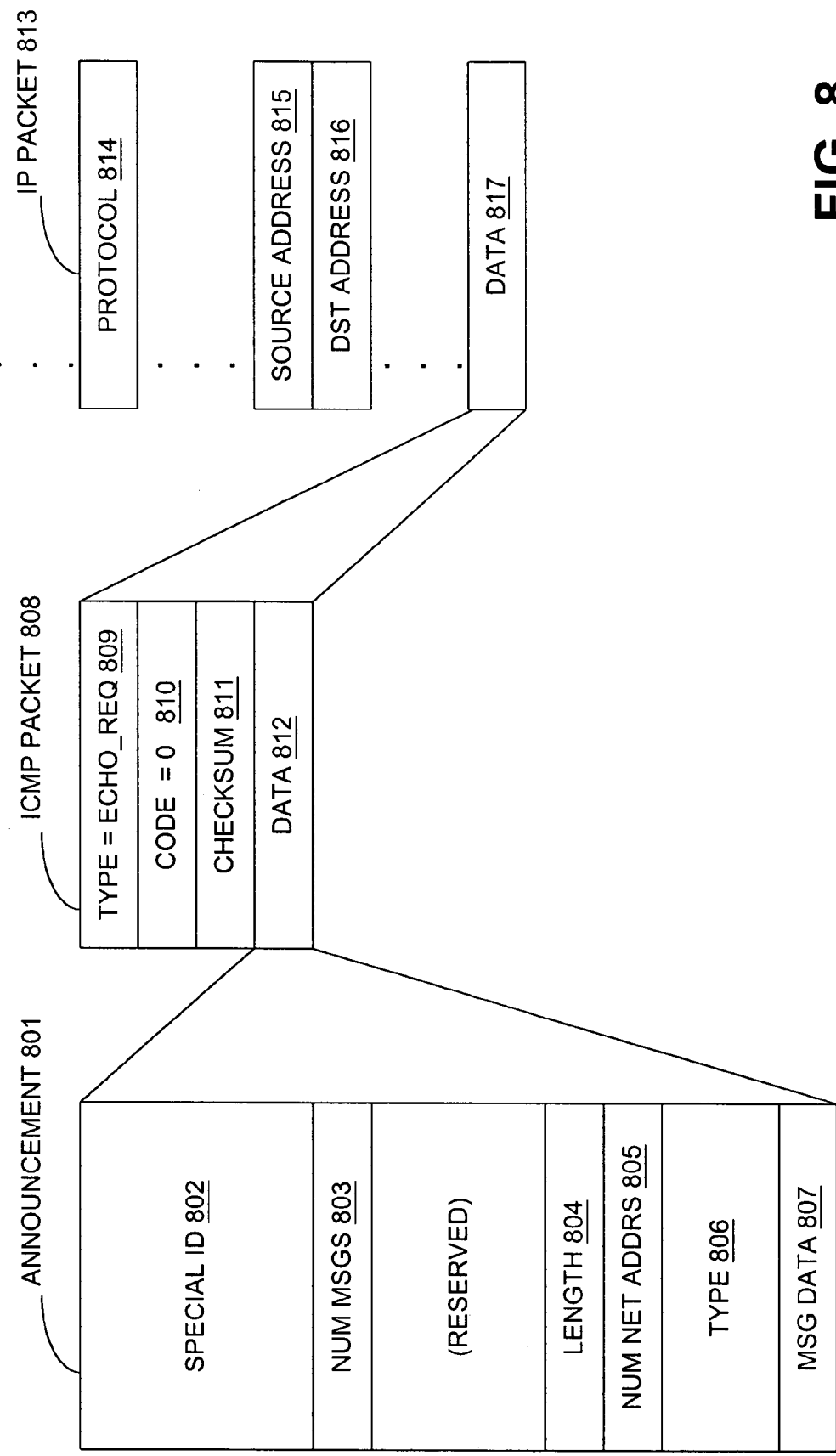
FIG. 8 shows the structure of an announcement packet used in one embodiment of a system and method for automatic discovery of network nodes.

FIG. 8 shows the structure of an announcement packet used in an embodiment of a system and method for automatic discovery of network nodes. The announcement packet 801 comprises a number of fields: special identifier 802; number of messages 803; length 804; repeat count 805; message type 806; and message data 807.

The announcement packet 801 is encapsulated in an ICMP packet 808. That is, the announcement packet 801 is contained within the data field of the ICMP packet 808. An ICMP packet 808 comprises a number of fields: type 809; code 810; checksum 811 and data 812.

The ICMP packet 808 is itself encapsulated in an IP packet 813. That is, the ICMP packet 808 is contained within the data field of the IP packet 813. IP packet 813 will not be completely described here. Instead, only those fields in IP packet 813 which the system and method of the present invention affect will be described. Those fields are: protocol 814; source network address 815; destination network address 816; and data 817.

The announcement packet 801 is used as follows. One or more node addresses to be announced are put in the message data field 807. Repeat count 805 is set to the number of node addresses contained in this announcement. Special identifier 802 is set to a predetermined value such as "FEED" which distinguishes this from a standard Ping packet. Message Type 806 is set to a predetermined value which identifies the packet as an announcement. The length field 804 is set to the total length of the packet, which depends on the number of node addresses contained within.

The ICMP type field 809 is set to 8 and the ICMP code field 810 is set to 0, which identifies the ICMP packet 808 as an Echo Request.

The header of the IP packet 813 is filled in as follows. The protocol field 814 is set to 1, which identifies the IP packet as encapsulating an ICMP packet 808. The source network address 815 is set to the network address 103 which is making the announcement. The destination network address 816 is set to the network address 103 of a particular node which is the target of the announcement. As explained before, this network address is a unicast address, so that the announcement packet 801 is delivered (by the IP protocol layer) only to that particular node.

The announcement-finished packet (not shown) is similar, but message type 806 is set to a predetermined value which identifies the packet as an announcement-finished, and message data 807 is not used. The header of the ICMP packet 808, and the header of the IP packet 813, are filled in the same manner as for the announcement packet 801.

One skilled in the art should recognize that this is only one example of packet structures which could be used for announcements and announcement-finished, and that many other packet structures are possible.

Figure 9A:
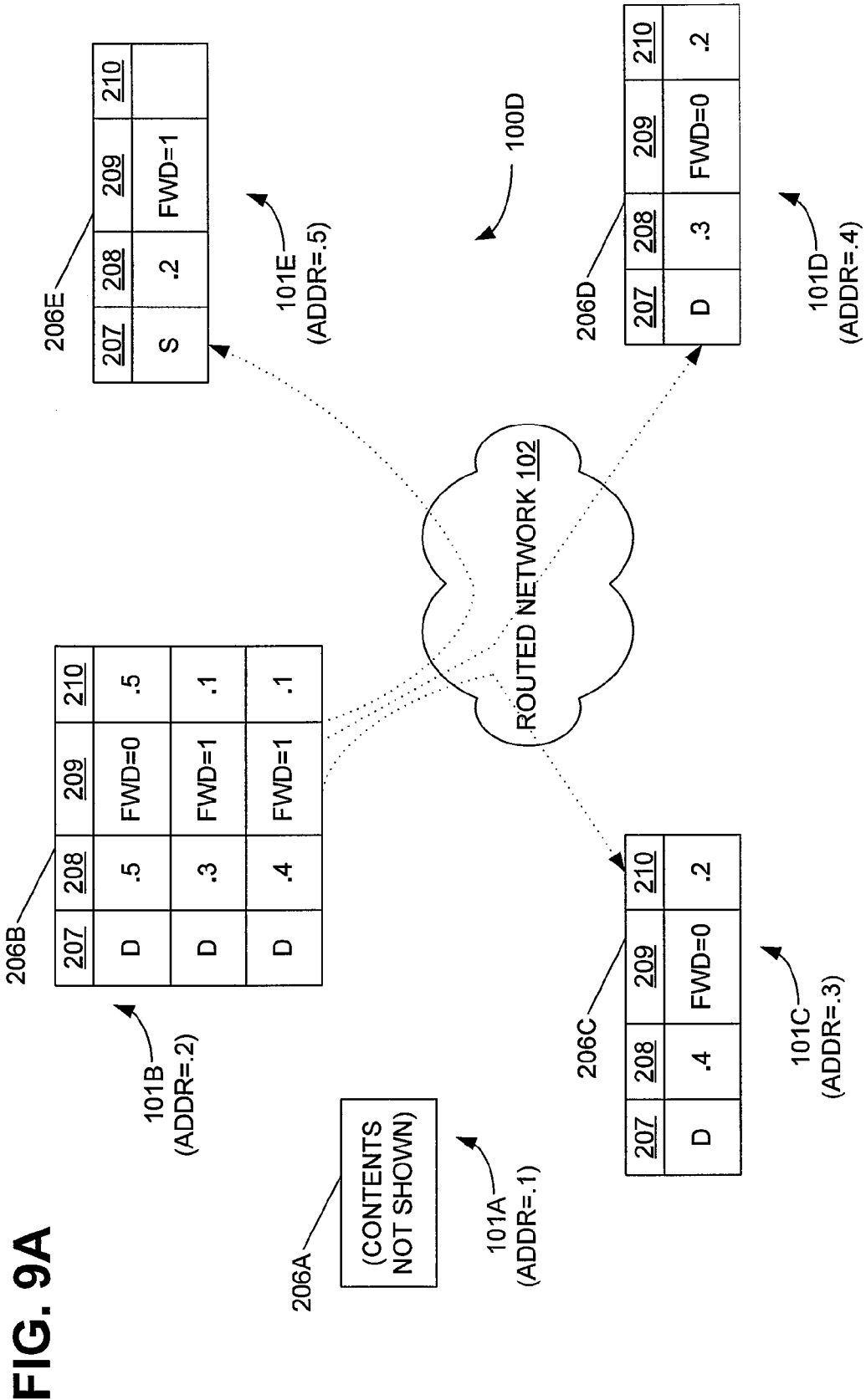
FIGS. 9A-B are a sequence of diagrams showing how the list of known nodes in each node is updated by announcements and forwarding in another embodiment of a system for automatic discovery of network addresses.
Figure 9B:
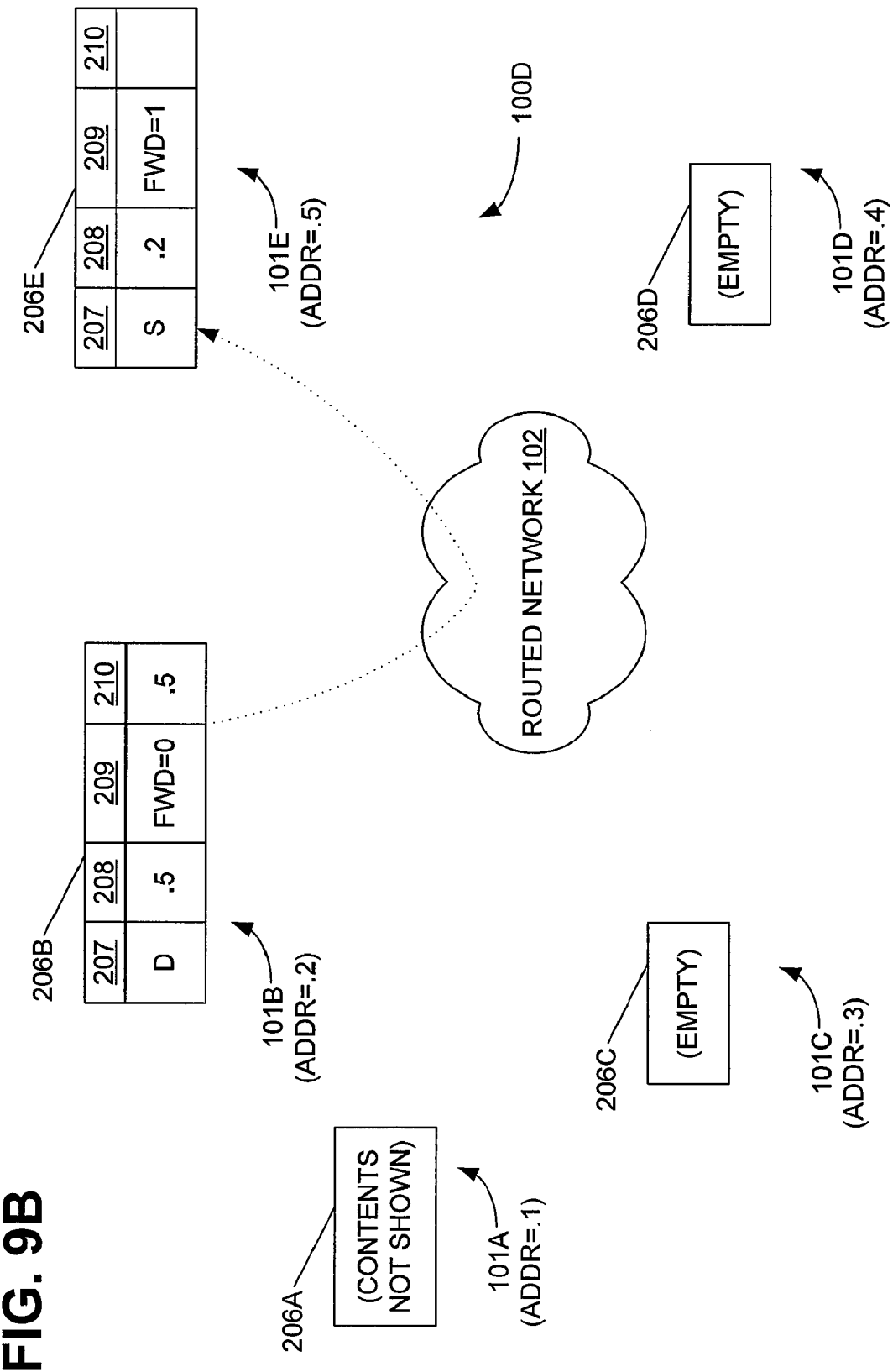

FIG. 9A-B illustrates another embodiment of the system and method for automatic discovery of network addresses. This embodiment detects when a node 101 becomes unreachable, and responds as follows. FIG. 9A shows network configuration 100d before the detection of an unreachable node, and FIG. 9B shows the configuration after detection.

In FIG. 9A, node 101b detects that node 101a is unreachable. In response to detection of unreachable node 101a, node 101b looks for entries in its list of known nodes 206b with a discovery source field 210 which matches the unreachable node 101a. (In nodes of Discovered type, the discovery source field 210 is set to the network address 103 of the node which sent the announcement.) Here the matching nodes have addresses .3 and .4.

Node 101d has deleted address .3 but the deletion announcement for its own address .4 has no effect.

In one embodiment, an unreachable node 101 is detected by receiving a deletion event from add/delete mechanism 210. In another embodiment, an unreachable node 101 is detected through a polling mechanism which periodically sends a poll packet to each node 101 in list 206 and receives a response in return. If a particular node 101 stops responding to polls, then the node is considered unreachable by the poll sender. One skilled in the art will recognize that the polling mechanism can be implemented in various ways. For example, a responder can be considered unreachable after a single response is missed, or after more than one response is missed. In some embodiments an aging technique is used, such that when a first poll response is missed, the poller records the event and/or the time the response was missed. If the poller sends out subsequent polls that are also missed, the poller ages the matching nodes again to update the event and/or time the response is missed. When a predetermined number of polls are missed, the poller determines that the node with missing responses is unreachable, and proceeds as described above.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

Therefore, having thus described the invention, at least the following is claimed:

1. A system for automatically discovering nodes on a network comprising:
   announcer logic configured to transmit a first announcement packet to all known nodes having a static type in a list of known nodes, the first announcement packet comprising a node address and a forward counter associated with each known node in the list having a corresponding forward count greater than zero, the forward counter initialized from the corresponding forward count;
   listener logic configured to receive a second announcement packet comprising a node address and a forward counter, the listener logic further configured to add to the list of known nodes a received node having a discovered type, the received node associated with the node address and a corresponding forward count defined by the decremented forward counter; and
   forwarder logic configured to transmit a third announcement packet to all known nodes in the list of known nodes when the forward count associated with the received node is greater than zero, the third announcement packet comprising the node address associated with the received node and a forward counter initialized from the forward count corresponding to the received node.

2. The system of claim 1, wherein the announcer logic is further configured to transmit the node address and the forward counter using a unicast address.

3. The system of claim 1, wherein the forward counter of the second announcement packet is decremented upon receipt.

4. The system of claim 1, wherein the forward counter of the second announcement packet is the decremented before transmission.

5. The system of claim 1, further comprising a network interface configured to transmit and receive data on the network.

6. The system of claim 5, wherein the announcer logic is further configured to transmit the first announcement packet via the network interface.

7. The system of claim 1, wherein the node address is an IP address.

8. The system of claim 1, wherein the announcement packet is an ICMP packet with type Echo Request.

9. A method for automatically discovering nodes on a network comprising:
   initializing a first known node list;
   transmitting a first announcement packet to all known nodes in the first list, the first announcement packet comprising a node address and a forward counter associated with each known node having a corresponding forward count greater than zero, the forward counter initialized from the corresponding forward count;
   receiving from the network a second announcement packet, the second announcement packet comprising a node address and a forward counter associated with a discovered node;
   adding to a second list of discovered nodes the discovered node, where the discovered node is associated with a forward count defined by the decremented forward counter; and
   transmitting a third announcement packet to all known nodes in the first list and all discovered nodes in the second list when the forward count associated with the discovered node is greater than zero, the third announcement packet comprising the node address associated with the discovered node and a forward counter initialized from the forward count associated with the discovered node.

10. The method of claim 9, wherein transmitting onto the network to all known nodes further comprises transmitting the network node address and the forward counter using a unicast address.

11. The method of claim 9, wherein transmitting onto the network to all known nodes and all discovered nodes further comprises transmitting the node address and the forward counter using a unicast address.

12. The method of claim 9, wherein transmitting an announcement packet to all known nodes further comprises decrementing the forward counter before transmission.

13. The method of claim 9, further comprising:
   detecting an unreachable node;
   deleting from the second list, responsive to detecting the unreachable node, each node with a discovery source matching the unreachable node; and
   announcing, to each node in the first and second lists, the deletion of each deleted node.

14. The method of claim 9, further comprising:
   receiving a deletion announcement, wherein the deletion announcement comprises at least one node to be deleted; and
   deleting from the second list, responsive to receiving the deletion announcement, each node corresponding to the node to be deleted.

15. The method of claim 14, further comprising forwarding, to each node in the first and second lists, the at least one node to be deleted.

16. A system for automatically discovering nodes on a network comprising:
   a list of static nodes, wherein each static node comprises a node address and a corresponding forward count;
   announcer logic configured to transmit to all static nodes the node address of each static node in the list having a corresponding forward count greater than zero and a corresponding forward counter initialized from the corresponding forward count;

a list of discovered nodes, wherein each discovered node comprises a node address and a corresponding forward count;

listener logic configured to receive an announcement packet comprising at least one node address and at least one corresponding forward counter, the listener logic further configured to add to the list of discovered nodes at least one discovered node comprising the at least one node address and a corresponding forward count defined by the decremented at least one corresponding forward counter of the announcement packet; and forwarder logic configured to transmit to all static nodes and to all discovered nodes, via the network interface, the node address of the at least one discovered node and a corresponding forward counter initialized from the corresponding forward count when the corresponding forward count is greater than zero.

17. The system of claim 16, wherein the announcer logic is further configured to transmit the node address and the corresponding forward counter using a unicast address.

18. The system of claim 16, wherein the forwarder logic is further configured to transmit the node address and the corresponding forward counter using a unicast address.

19. The system of claim 16, wherein the corresponding forward counter of the announcement packet is decremented upon receipt.

20. The system of claim 16, wherein the corresponding forward counter of the announcement packet is decremented before transmission.

21. The system of claim 16, further comprising a network interface configured to transmit and receive data on the network.

22. The system of claim 21, wherein the announcer logic is further configured to transmit the node address and the corresponding forward counter via the network interface.

23. The system of claim 21, wherein the forwarder logic is further configured to transmit the node address and the corresponding forward counter via the network interface.

24. The system of claim 21, wherein the listener logic is further configured to receive the announcement packet via the network interface.

25. The system of claim 16, wherein the node address is an IP address.

26. The system of claim 16, wherein the announcement packet is an ICMP packet with type Echo Request.

27. A system for automatically discovering nodes on a network comprising:

means for initializing a first known node list;

means for transmitting a first announcement packet to all known nodes in the first list, the first announcement packet comprising a node address and a forward counter associated with each known node having a corresponding forward count greater than zero, the forward counter initialized from the corresponding forward count;

means for receiving from the network a second announcement packet, the second announcement packet comprising a node address and a forward counter associated with a discovered node;

means for adding to a second list of discovered nodes the discovered node, where the discovered node is associated with a forward count defined by the decremented forward counter; and means for transmitting a third announcement packet to all known nodes in the first list and all discovered nodes in the second list when the forward count associated with the discovered node is greater than zero, the third announcement packet comprising the node address associated with the discovered node and a forward counter initialized from the forward count associated with the discovered node.

28. The system of claim 27, wherein means for transmitting further comprises means for decrenting the forward counter before transmission.

29. The system of claim 27, wherein means for receiving further comprises means for decrenting the forward counter upon receipt.

30. The system of claim 27, further comprising:

means for detecting an unreachable node;

means for deleting from the second list, responsive to detecting the unreachable node, each node with a discovery source matching the unreachable node; and means for announcing, to each node in the first and second lists, the deletion of each deleted node.

31. The system of claim 27, further comprising:

means for receiving a deletion announcement, wherein the deletion announcement comprises at least one node to be deleted; and means for deleting from the second list, responsive to receiving the deletion announcement, each node corresponding to the node to be deleted.

32. The system of claim 31, further comprising means for forwarding, to each node in the first and second lists, the at least one node to be deleted.

33. The system of claim 27, further comprising means for interfacing with a network to transmit and receive data.

\* \* \* \* \*

UNITED STATES PATENT AND TRADEMARK OFFICE
CERTIFICATE OF CORRECTION

PATENT NO. : 7,408,882 B2  Page 1 of 1
APPLICATION NO. : 10/602940
DATED : August 5, 2008
INVENTOR(S) : Abdo, Munroe and Venz It is certified that error appears in the above-identified patent and that said Letters Patent is hereby corrected as shown below:

Figure 2, delete "210," and insert --214--.

Column 5, line 51, delete "210," and insert --214--.

Column 6, line 12, delete "210," and insert --214--.

Column 6, line 39, delete "210," and insert --214--.

Column 7, line 59, delete "210," and insert --214--.

Column 8, line 65, after "for node 101c." insert:

--Both entries have the forward count field 209 set to 1 and the type field 207 set to Static. This set of entries for list 206a implies the existence of unidirectional paths 601 and 602.--.

Column 10, line 23, after "for node 101c." insert

--Both entries have the type field 207 set to Static and the forward count field 209 set to 2. This set of entries for list 206a implies the existence of unidirectional paths 601 and 602.--.

Column 12, line 63, delete "210," and insert --214--.

Signed and Sealed this

Sixth Day of January, 2009

JON W. DUDAS
*Director of the United States Patent and Trademark Office*